United States Patent
Park et al.

(10) Patent No.: US 7,451,044 B2
(45) Date of Patent: Nov. 11, 2008

(54) NAVIGATION SYSTEM USING WIRELESS COMMUNICATION NETWORK AND ROUTE GUIDANCE METHOD THEREOF

(75) Inventors: Sang-Ho Park, Ahnyeng (KR);
Be-Young Chung, Suwon (KR);
Jung-Soo Kim, Seongnam (KR)

(73) Assignee: Samsung Electronics Co., Ltd (KR)

( * ) Notice: Subject to any disclaimer, the term of this patent is extended or adjusted under 35 U.S.C. 154(b) by 348 days.

(21) Appl. No.: 10/893,835

(22) Filed: Jul. 19, 2004

(65) Prior Publication Data
US 2004/0260458 A1 Dec. 23, 2004

Related U.S. Application Data

(63) Continuation of application No. 09/931,781, filed on Aug. 17, 2001.

(30) Foreign Application Priority Data

Aug. 18, 2000 (KR) ............... 2000-47955
Oct. 23, 2000 (KR) ............... 2000-62283

(51) Int. Cl.
*G01C 21/30* (2006.01)
(52) U.S. Cl. .............. 701/210; 701/200; 701/207; 701/208; 701/209; 340/988; 455/556.1; 455/557
(58) Field of Classification Search ............ 701/117, 701/118, 119, 201, 202, 208, 209, 210, 211; 340/905, 988, 990, 995.12, 995.18, 995.19, 340/995.2; 455/556, 557
See application file for complete search history.

(56) References Cited

U.S. PATENT DOCUMENTS

| | | | |
|---|---|---|---|
| 4,954,959 A * | 9/1990 | Moroto et al. ............... 701/211 |
| 5,293,163 A | 3/1994 | Kakihara et al. |
| 5,544,061 A * | 8/1996 | Morimoto et al. ............ 701/202 |
| 5,608,635 A * | 3/1997 | Tamai ......................... 701/209 |
| 5,654,892 A * | 8/1997 | Fujii et al. .................. 701/211 |
| 5,808,565 A | 9/1998 | Matta et al. |
| 5,818,356 A | 10/1998 | Schuessler |
| 5,875,412 A | 2/1999 | Sulich et al. |
| 5,889,477 A | 3/1999 | Fasterrath |
| 5,919,246 A | 7/1999 | Waizmann et al. |
| 5,963,546 A * | 10/1999 | Shoji ........................... 370/255 |
| 5,987,381 A | 11/1999 | Oshizawa |
| 6,012,012 A | 1/2000 | Fleck et al. |

(Continued)

FOREIGN PATENT DOCUMENTS

JP 02-277200 11/1990

(Continued)

*Primary Examiner*—Khoi H. Tran
*Assistant Examiner*—Marie A Weiskopf
(74) *Attorney, Agent, or Firm*—The Farrell Law Firm, PC

(57) ABSTRACT

There is provided a navigation system using a wireless communication system and a route guidance method thereof. In the navigation system, an information center searches out an optimum route between a present vehicle position and a destination referring to map data in its map database and generates route guidance data. A navigation terminal inside the vehicle calculates the present position of the vehicle, transmits the vehicle's current position information to the information center, receives the route guidance data, and announces a notification message. A wireless communication network connects the information center to the navigation terminal wirelessly.

19 Claims, 31 Drawing Sheets

U.S. PATENT DOCUMENTS

| | | | |
|---|---|---|---|
| 6,029,072 A * | 2/2000 | Barber .................... 455/557 |
| 6,046,688 A | 4/2000 | Higashikata et al. |
| 6,049,711 A | 4/2000 | Ben-Yehezkel et al. |
| 6,092,020 A | 7/2000 | Fastenrath et al. |
| 6,104,315 A | 8/2000 | Volkel et al. |
| 6,125,326 A | 9/2000 | Ohmura et al. |
| 6,178,377 B1 * | 1/2001 | Ishihara et al. ............ 701/200 |
| 6,178,378 B1 | 1/2001 | Leibold |
| 6,292,743 B1 * | 9/2001 | Pu et al. .................. 701/202 |
| 6,314,365 B1 * | 11/2001 | Smith ..................... 701/200 |
| 6,349,259 B1 * | 2/2002 | Sato ...................... 701/207 |
| 6,427,115 B1 * | 7/2002 | Sekiyama ................. 701/208 |
| 2001/0020213 A1 | 9/2001 | Hatano |

FOREIGN PATENT DOCUMENTS

| | | |
|---|---|---|
| JP | 04111543 A * | 4/1992 |
| JP | 10-96644 | 4/1998 |
| JP | 10-96645 | 4/1998 |

\* cited by examiner

| NO | DATA |
|---|---|
| 1 | 100m AHEAD |
| 2 | 200m AHEAD |
| 3 | . . . . |
| N | TURN RIGHT |
| N+1 | . . . . |
| M | 2 O'CLOCK DIRECTION |

MODE CONVERSION INITIAL STATE

SET/REGISTER

1. DESTINATION SETTING
    0. HOME
    1-1. NEW SETTING
    1-2. ADD DESTINATION
    1-3. -DEPARTURE NEXT
        -PASSING 1 NEXT
        -ADD DESTINATION
    1-4. VIRTUAL TRAVEL

2. REGISTER LOCATION
    0. HOME
    1-1. NEW SETTING
        ① PRESENT POSITION
        ② LOCATION SEARCH
        ③ LATITUDE AND LONGITUDE
        ④ PHONE NUMBER
    1-2. DELETE/AMEND
        ① HOME
        ② DELETE
        ③ AMEND
        ④ CHANGE NAME

■ ROUTE GUIDE

3. ROUTE SEARCH/GUIDE
    0. ROUTE SEARCH
    3-1. GUIDE
        ① GUIDE DISPLAYS
        ② ON TRACK
        ③ OFF TRACK
        ④ TRAFFIC INFORMATION CHANGE
        ⑤ LINE BUSY(?)
    3-2. RE-SEARCH

4. TRAFFIC INFORMATION(AUTOMATIC UPDATE) NOTIFICATION SETTING(AUTO, OFF, 5MIN, 10MIN, 30MIN)

■ TRAFFIC INFORMATION

5. TRAFFIC INFORMATION SEARCH
    5-1. NEIGHBORHOOD
    5-2. HIGHWAY SECTIONS
    5-3. FREEWAYS
    5-4. BRIDGES
    5-5. TUNNELS

■ AUXILIARY FUNCTION

6. AUXILIARY FUNCTION
    6-1. GPS LATITUDE AND LONGITUDE COORDINATES
    6-2. SENSOR INFORMATION
    6-3. NAVIGATION VERSION (CHECK)

FIG. 29
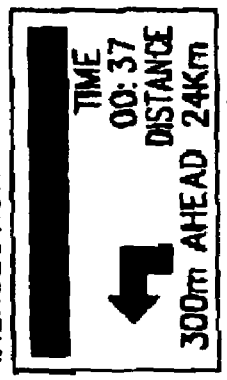
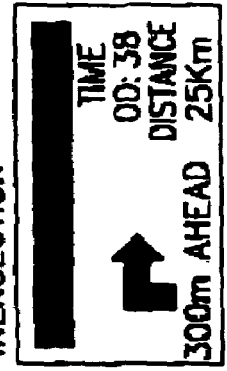
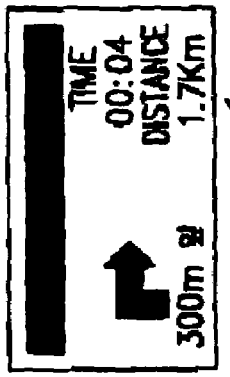
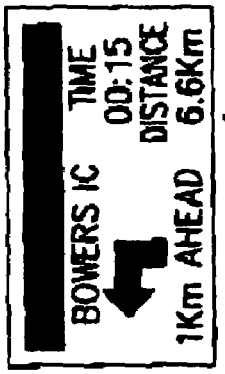
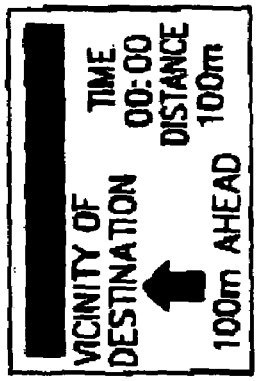

NAVIGATION SYSTEM USING WIRELESS COMMUNICATION NETWORK AND ROUTE GUIDANCE METHOD THEREOF

PRIORITY

This application is a continuation of application Ser. No. 09/931,781, filed Aug. 17, 2001, and which claims priority to an application entitled "Navigation system Using Wireless Communication Network and Route Guidance Method Thereof" filed in the Korean Industrial Property Office on Aug. 18, 2000 and assigned Serial No. 2000-47955, and to an application entitled "Navigation system Using Wireless Communication Network and Route Guidance Method Thereof" filed in the Korean Industrial Property Office on Oct. 23, 2000 and assigned Serial No. 2000-62283, the contents of each of which are incorporated herein by reference.

BACKGROUND OF THE INVENTION

1. Field of the Invention

The present invention relates generally to a navigation system and method, and in particular, to a navigation system using a wireless communication network and a route guidance method thereof.

2. Description of the Related Art

A typical navigation system pinpoints the present position of a moving object on a map displayed on a display based on information received from the GPS (Global Positioning System). The navigation system provides information necessary for driving such as the heading of the moving object, the distance to a destination, the velocity of the moving object, a route set by a driver before departure, and an optimum route to the destination. The navigation system or GPS device is mounted to a moving object such as a vessel, an aircraft, and a vehicle to acquire the position, velocity and route information of the moving object. Particularly, the navigation system calculates the position of a moving object according to signals indicating a 3-D coordinate (latitude, longitude and altitude) position received from GPS satellites and pinpoints the present position to its driver visually or audibly.

FIG. 1 illustrates a typical navigation system configuration. The following description is made in the context of a navigation system-equipped vehicle.

Referring to FIG. 1, a GPS receiver 12 receives signals from a plurality of GPS satellites via an antenna (not shown). A gyro-sensor 14 and a velocity sensor 16 form a sensing unit for sensing the driving angle and velocity of a vehicle. A map data storage 18 stores map data and other additional information. The map data storage 18 is usually a CD-ROM (Compact Disk-Read Only Memory).

A controller 10 provides overall control to the navigation system. For example, the controller 10 calculates the present pseudo-position of the vehicle based on information about the driving angle and velocity of the vehicle received from the sensing unit and selects one of present pseudo-position coordinates received from the GPS receiver 12 and the calculated pseudo-position coordinates. If an accumulation error of the sensing unit is small, the calculated pseudo-position is selected and, if the accumulation error is large, the accumulation error is compensated for with the value received from the GPS receiver 12. Aside from the present vehicle position, the controller 10 calculates the velocity and direction of the vehicle. Based on the traveling information, the controller 10 reads the map data of the neighborhood from the map data storage 18 and displays it on a display 26 while outputting it through a speaker 29. The controller 10 additionally provides an optimum route leading to a destination. A ROM 20 stores an operation program for the controller 10 and a RAM (Random Access Memory) 22 temporarily stores data processed during the operation of the navigation system. A graphic processor 24 processes the traveling information to graphic data for the driver to view The display 26 displays the graphic data. The display 26 can be a CRT (Cathode Ray Tube) or an LCD (Liquid Crystal Display). A voice processor 28 processes the traveling information to voice data for the driver to hear. The speaker 29 outputs the voice data. The graphic processor 24 and the voice processor 28 process map data read from the map data storage 18 and graphic data representing varying states during operation to graphic data and voice data, respectively.

The thus-constituted navigation system is mounted as a separate device to a moving object, like a vehicle, to offer services such as route guidance to its driver. However, this navigation system has limitations in providing route guidance reflecting real-time varying traffic conditions and dynamic road conditions. Meanwhile, real-time varying traffic conditions can be informed via a mobile terminal like a handheld phone without using a separately procured navigation system.

FIG. 2 illustrates a conventional navigation service provided via a mobile terminal, that is, over a wireless communication network.

Referring to FIG. 2, a user can acquire traffic information visually from a display or audibly from a speaker in the mobile terminal. The traffic information, however, represents mere traffic conditions of a particular road rather than guiding the user to a safe and suitable route avoiding congested roads.

Meanwhile, a route guidance scheme can be explored with a navigation system-equipped mobile terminal. The route guidance requires a large capacity memory in the mobile terminal since it depends on a map database. For example, a 30 to 200 MB memory, though the memory requirement varies with digital map databases, is required to build a database with the map data of the overall areas of Korea.

Yet, mounting the large capacity memory to the mobile terminal is against the trend of miniaturization and increases cost. Moreover, use of a fixed memory for a map database, such as a CD-ROM, a flash memory, a mask ROM, or a hard disk, makes it difficult to update the map database adaptively to changes in road conditions or traffic regulations and provide route guidance with real time traffic condition information.

SUMMARY OF THE INVENTION

An object of the present invention is, therefore, to provide a navigation system and a route guidance method thereof in which a moving object is guided to an optimum route through a mobile terminal.

Another object of the present invention is to provide a navigation system and a route guidance method thereof, in which a moving object is guided to an optimum route through a compact mobile terminal.

A further object of the present invention is to provide a navigation system and a route guidance method thereof, in which a moving object is guided to an optimum route through a low cost mobile terminal.

Still another object of the present invention is to provide a navigation system and a route guidance method thereof, in which a moving object is guided to an optimum route accurately based on updated map data through a mobile terminal.

Yet another object of the present invention is to provide a navigation system and a route guidance method thereof, in which a moving object is guided to an optimum route based on real-time traffic information through a mobile terminal.

The foregoing and other objects of the present invention are achieved by providing a navigation system using a wireless communication network and a route guidance method thereof. In the navigation system, an information center has a map database, receives information about the present vehicle position and a destination from a navigation terminal, searches out an optimum route between the present position and the destination referring to map data in the map database, and generates route guidance data to guide a vehicle to at least one node point in the optimum route. The navigation terminal, inside the vehicle calculates the present position of the vehicle, transmits the vehicle's current position information to the information center, receives the route guidance data, and announces a notification message about the node point by voice in a predetermined period before the vehicle passes through the node point. The wireless communication network connects the information center to the navigation terminal wirelessly.

BRIEF DESCRIPTION OF THE DRAWINGS

The above and other objects, features and advantages of the present invention will become more apparent from the following detailed description when taken in conjunction with the accompanying drawings in which:

FIG. 20 illustrates voice data examples used for route guidance according to the present invention;

FIG. 22 illustrates menus displayed for route guidance in the navigation terminal according to the present invention;

FIG. 29 illustrates displays provided when a route is guided during driving in the navigation terminal according to the present invention;

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

A navigation system according to the present invention is characterized in that a navigation function is implemented based on real-time traffic through a mobile terminal without a separately procured large capacity memory by receiving the least data required for route guidance over a wireless communication network. Vehicle tracking is performed based on the least data necessary for route guidance and the route guidance is provided to a user visually and/or audibly. Components of a navigation terminal sharable among users are deployed in an information center that provides information necessary for route guidance in order to reduce terminal cost. Furthermore, the information center is so configured that it can be shared by more users, resulting in minimization of a cost constraint on an individual user. Consequently, navigation systems will become more popular. Hereinbelow, there will be given a description of effective discrimination between components to be installed in a terminal and components moved to an information center. Also, an effective communication scheme between the terminal and the information center will be presented which minimizes the number of communications and communication time.

Figure 1:
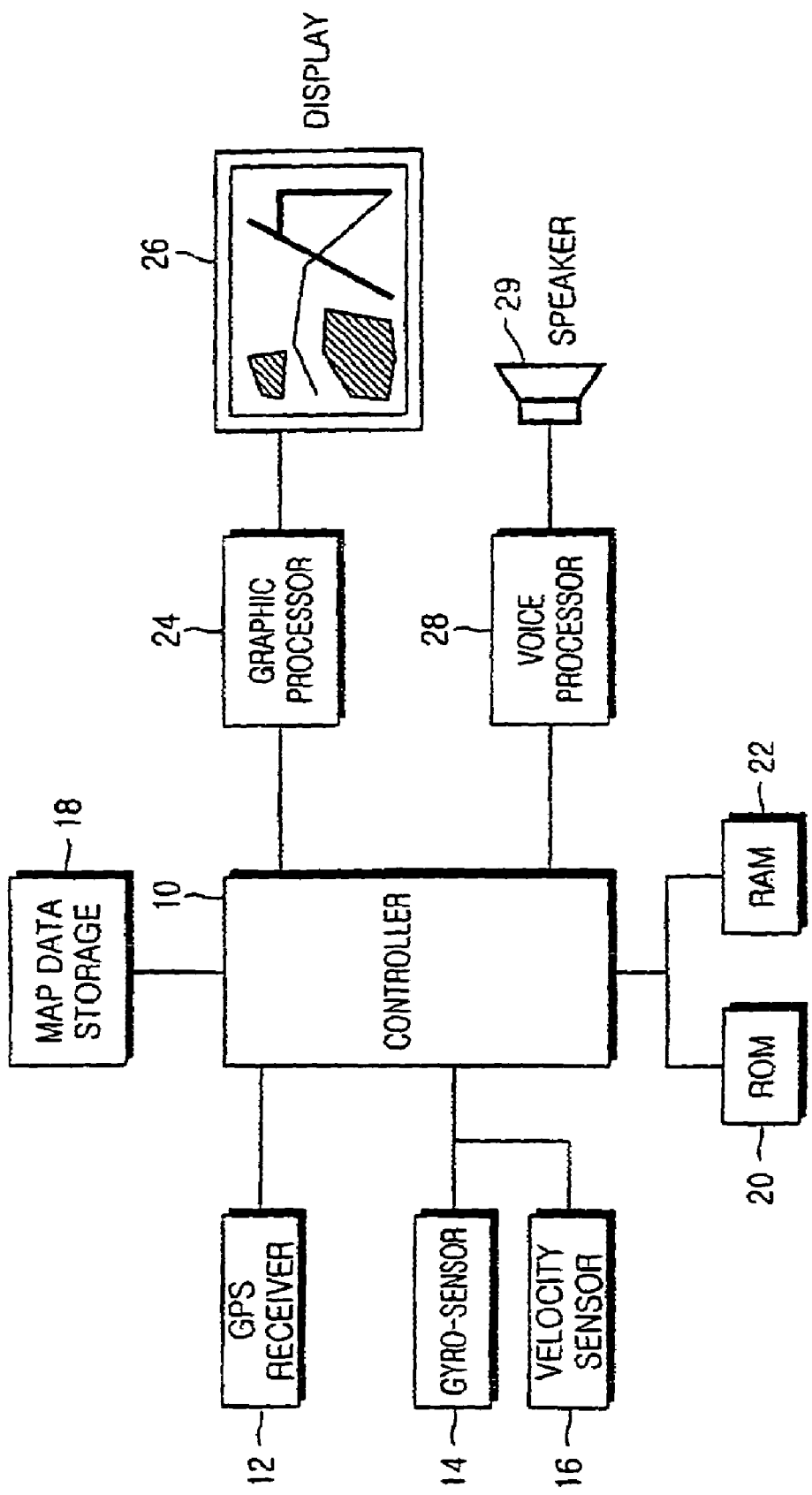
FIG. 1 illustrates a typical navigation system configuration.
Figure 2:
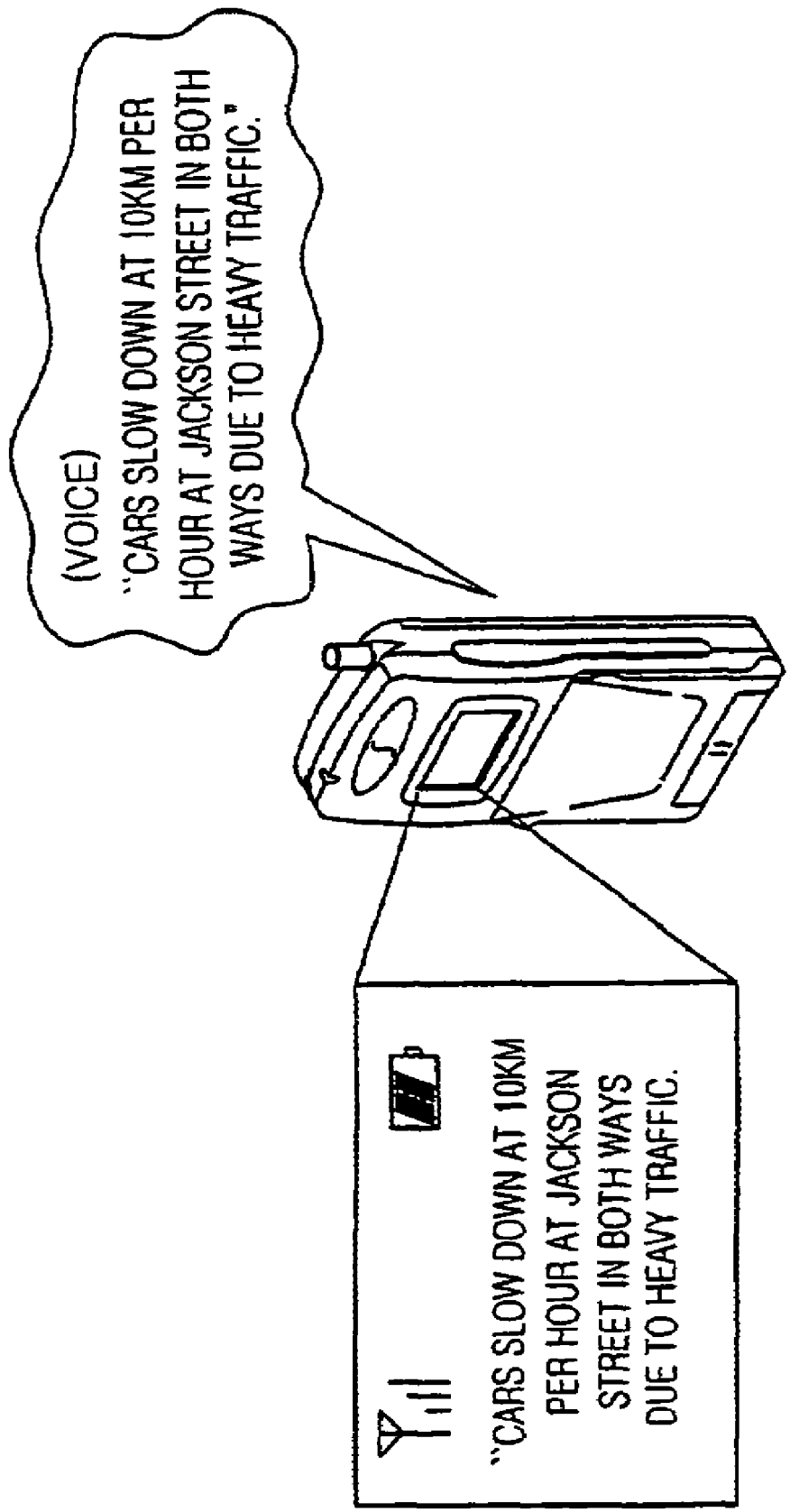
FIG. 2 illustrates a conventional navigation service provided through a mobile terminal.
Figure 3:
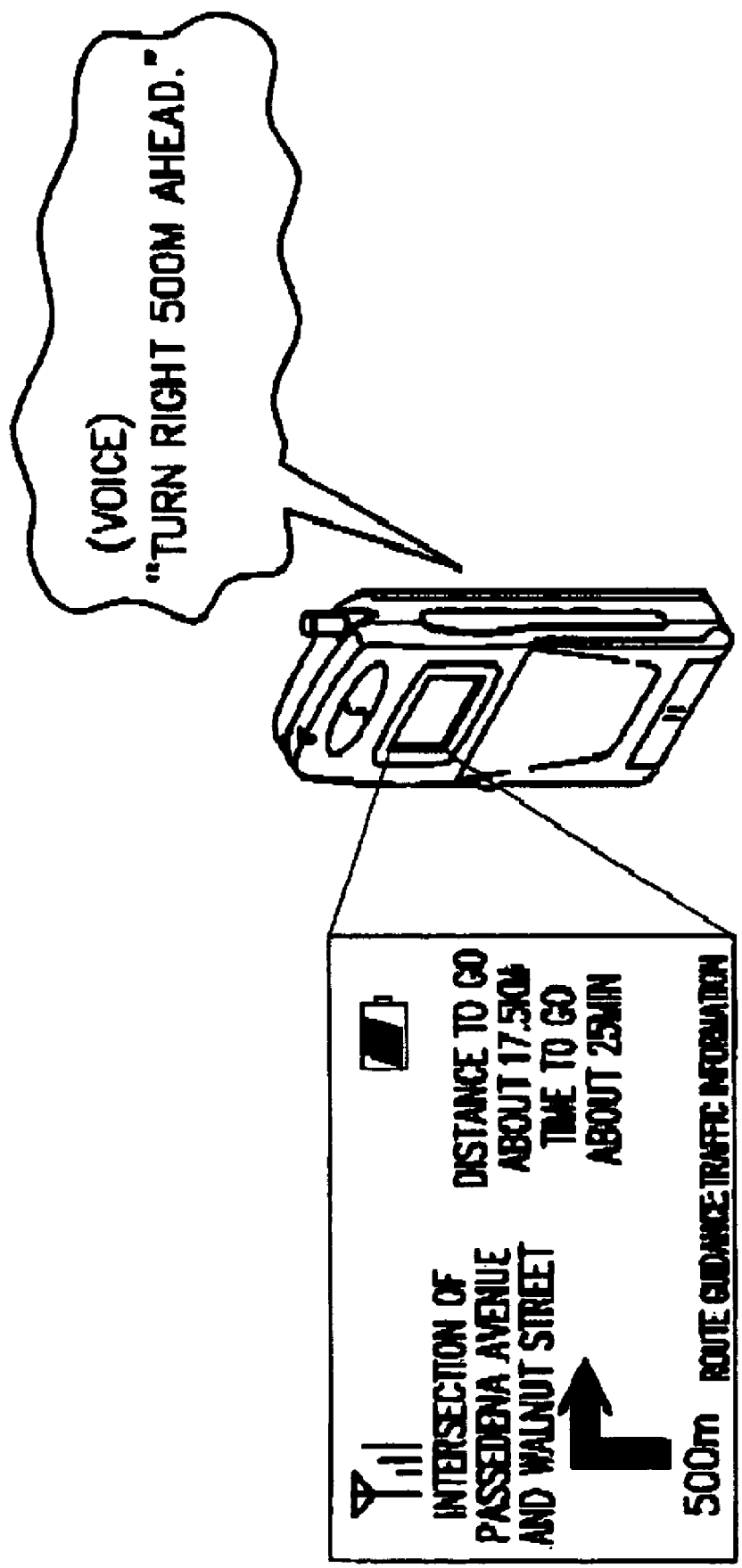
FIG. 3 illustrates an example of navigation information offered through a mobile terminal according to the present invention.

FIG. 3 illustrates an example of navigation information provided through a mobile terminal according to the present invention.

Referring to FIG. 3, the shortest route to a destination without traffic jam is offered visually or audibly through the mobile terminal. The distance to the destination ("distance to go: about 17.5 Km") and expected time ("time to go: about 25 min") are displayed on a display (e.g., LCD) of the mobile terminal. The shortest route without traffic jam is also given visually as "Intersection of Pasadena Avenue and Walnut Street+turn right image+500 m" and audibly as "Turn right 500 m ahead".

Figure 4:
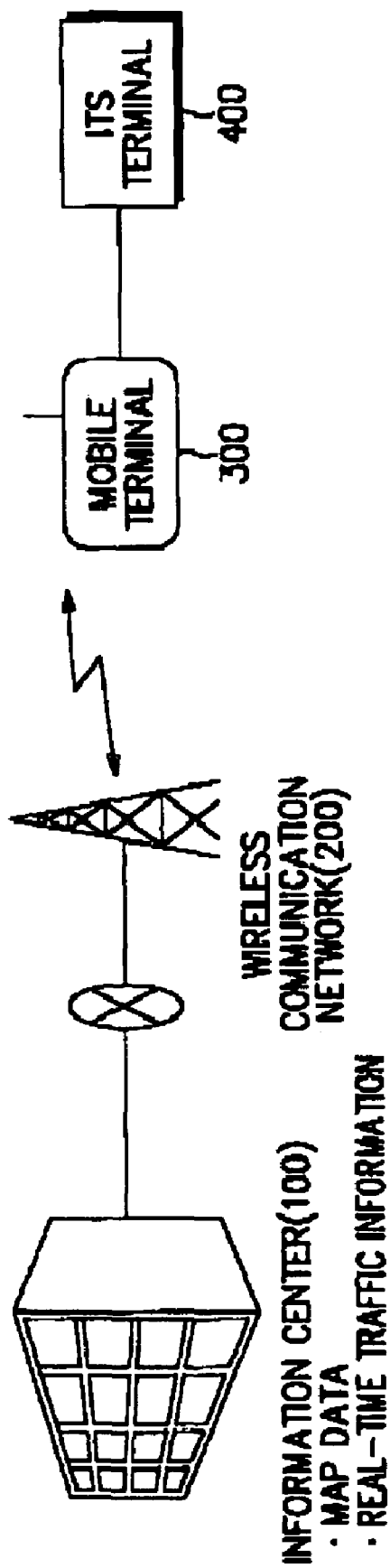
FIG. 4 is a schematic view of a navigation system according to the present invention.

FIG. 4 is a schematic view of a navigation system according to the present invention. This navigation system provides a navigation service through a mobile terminal in such a way as shown in FIG. 3.

Referring to FIG. 4, the navigation system is comprised of an information center 100, a wireless communication network 200, a mobile terminal 300, and an ITS (Intelligent Transportation System) terminal 400.

The information center 100 stores map data and real-time traffic information. Upon request of a navigation function from the mobile terminal 300, the information center 100 generates corresponding navigation information based on the map data and real-time traffic information and provides the navigation information to the mobile terminal 300 over the wireless communication network 200. For example, when the mobile terminal 300 requests an optimum route leading to a destination, the information center 100 generates information about the optimum route referring to the map data and real-time traffic information.

The wireless communication network 200 interfaces between the information center 100 and the mobile terminal 300. A PCS (Personal Communication System) system or a digital cellular system based on IS-95A, 95B or 95C can be used as the wireless communication network 200. A CDMA (Code Division Multiple Access) system such as IMT-2000 (International Mobile Telecommunications-2000) or UMTS (Universal Mobile Telecommunication Systems) can be also employed as the wireless communication network 200.

The mobile terminal 300 operates in a navigation mode according to the present invention as well as in a typical voice call mode. In the navigation mode, the mobile terminal 300 is connected to the wireless communication network 200, receives navigation information from the information center 100, and provides the navigation information to the user in cooperation with the ITS terminal 400.

In the navigation mode, the user sets the present position of his vehicle and a destination in the mobile terminal 300, requests guidance to an optimum route to the information center 100, and receives information about the optimum route from the information center 100. Here, the user can set the destination by the name of a facility, a local category, a province, a phone number, and a 2-D (latitude and longitude) coordinate by voice or by characters. The user can also receive traffic information (e.g., information about what is ahead, downtown, highways, freeways, book-marked waypoints, and etc.). In addition, the user can search for facilities in the neighborhood like gas stations, repair centers, banks, clinics, drugstores, lodging, places for sightseeing, restaurants, coffee shops, and cinemas/theaters and receive information related with daily living such as news, weather forecasts, TV programs, movies, plays, performances, horoscope, and humorous tips.

If the user sets the present vehicle position and an intended destination and requests an optimum route in the navigation mode, the set information is transmitted to the information center 100 through the wireless communication network 200. The information center 100 calculates an optimum route to the destination based on the internal map data and real-time traffic information and guides the mobile terminal 300 to the optimum route over the wireless communication network 200. Upon receipt of the optimum route information, the mobile terminal 300 provides it to the user visually and/or by voice in cooperation with the ITS terminal 400 in such a way as shown in FIG. 3. The optimum route information is displayed graphically on the display of the mobile terminal 300 and output by voice through the speaker of the mobile terminal 300, the speaker of the ITS terminal 400, or both. The optimum route information includes bearing (guided direction), guide waypoints, and distance to go.

In FIG. 4, the mobile terminal 300 and the ITS terminal 400 may be incorporated into one terminal to implement the navigation operation according to the present invention. However, considering compatibility with other existing terminals, it is preferable to separate the mobile terminal 300 from the ITS terminal 400. The ITS terminal 400 can be connected to the mobile terminal 300 and a TFT-LCD (thin Film Transistor-LCD) unit 40 as shown in FIGS. 5 and 6.

Figure 5:
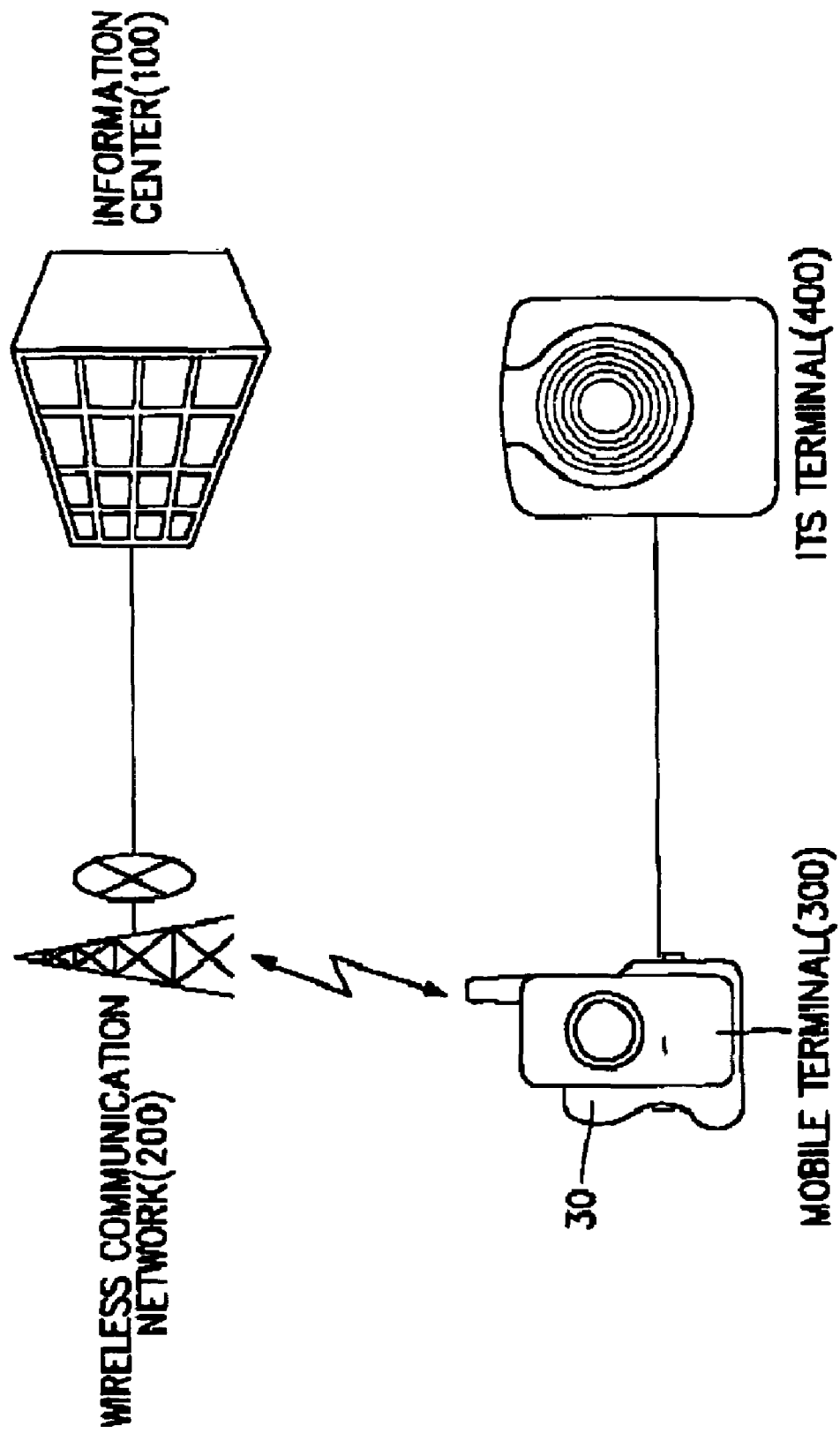
FIG. 5 illustrates an embodiment of the navigation system according to the present invention.

FIG. 5 illustrates an embodiment of the navigation system according to the present invention.

Referring to FIG. 5, the navigation system includes the information center 100, the wireless communication network 200, the mobile terminal 300, and the ITS terminal 400. The mobile terminal 300 may be held in a cradle 30 within a vehicle. The mobile terminal 300 is connected to the ITS terminal 400. The ITS terminal 400 is connected to the information center 100 via the mobile terminal 300 and the wireless communication network 200, for receiving a navigation service. The ITS terminal 400 interworks with the mobile terminal 300 to provide navigation information received from the information center 100 to the user. The navigation information includes route guidance information, traffic information, and geographical information like in-vicinity facilities. A detailed description of the ITS terminal 400 will be given later with reference to FIG. 8.

Figure 6:
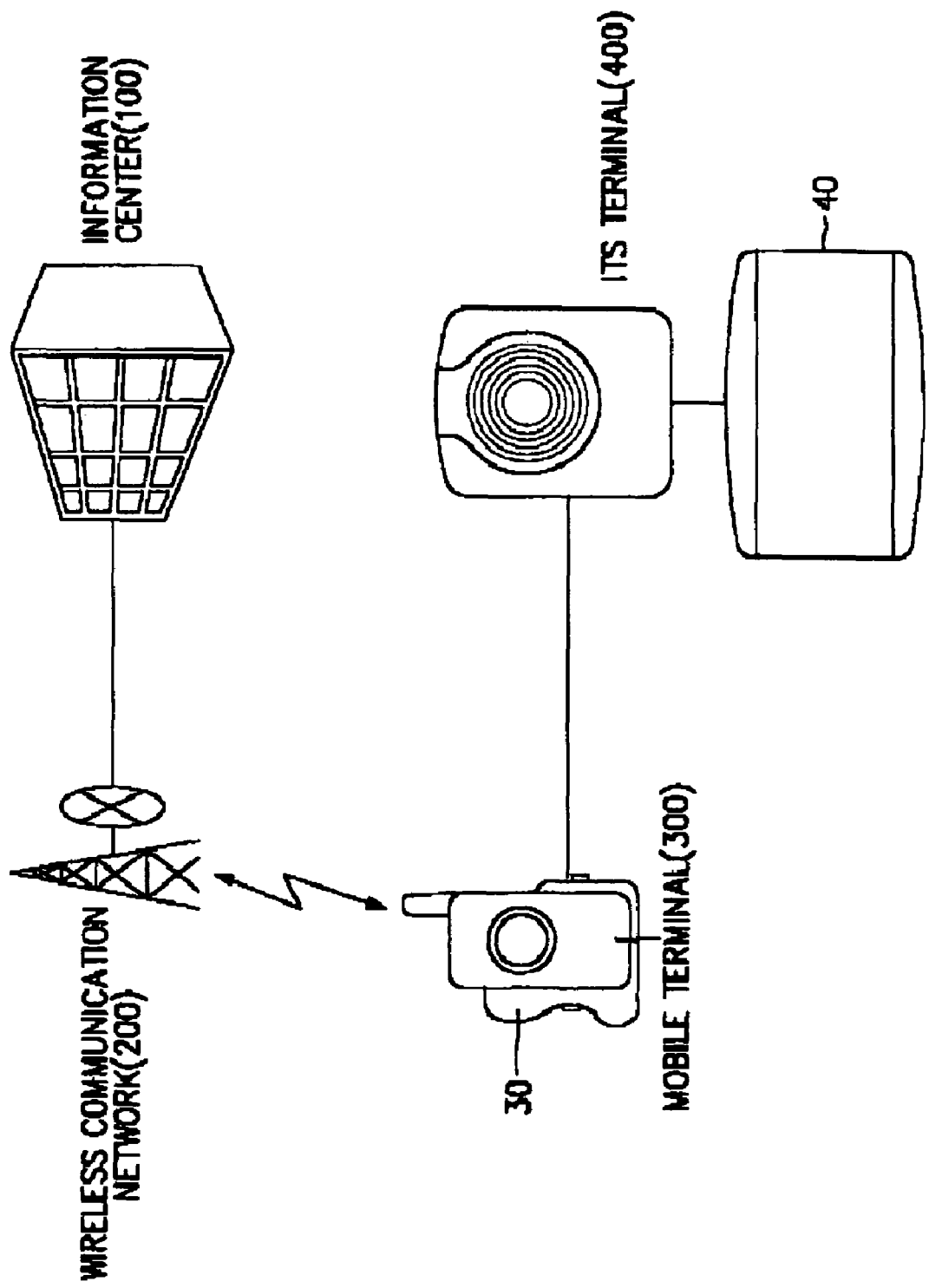
FIG. 6 illustrates another embodiment of the navigation system according to the present invention.

FIG. 6 illustrates another embodiment of the navigation system according to the present invention.

Referring to FIG. 6, the navigation system includes the information center 100, the wireless communication network 200, the mobile terminal 300, and the ITS terminal 400 like the navigation system shown in FIG. 5, except that the ITS terminal 400 is equipped with the TFT-LCD 40. The TFT-LCD unit 40 will be later described with reference to FIG. 9.

The navigation systems shown in FIGS. 5 and 6 can be called "a popular navigation system" and "a premium navigation system", respectively because the TFT-LCD unit 40 is rather expensive.

Figure 7:
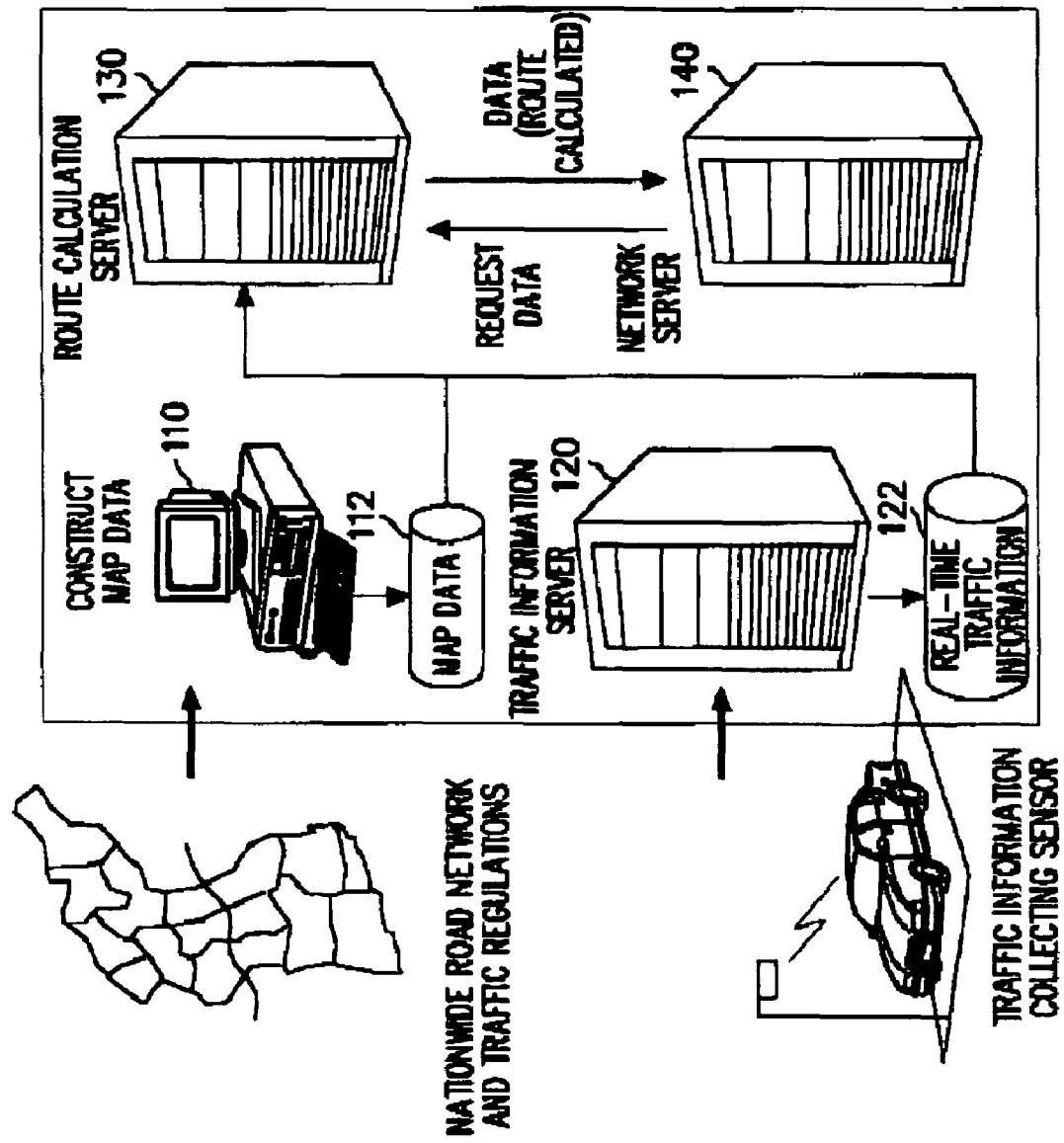
FIG. 7 is a schematic view of the information center according to the present invention.

FIG. 7 is a schematic view of the information center 100.

Referring to FIG. 7, the information center 100 includes a computer 110, a traffic information server 120, a route calculation server 130, a network server 140, a map data storage 112, and a real-time traffic information storage 122. The computer 110 builds map data according to preliminarily checked road and traffic conditions (e.g., nationwide road network and traffic regulations). The map data storage (or map database) 112 stores the map data. The traffic information server 120 generates real-time traffic information for the input of traffic data collected by traffic information collecting sensors and stores the real-time traffic information in the real-time traffic information storage 122. The real-time traffic information is collected from the traffic information collecting sensors installed on roads. For example, the traffic information collecting sensors sense the velocities of cars on the roads periodically and feed the sensed velocities to the traffic information server 120. Then the traffic information server 120 generates traffic information representing traffic conditions in real time. The route calculation server 130 calculates an optimum route from the present vehicle position to a destination based on the map data and the real-time traffic information stored in the map data storage 112 and the real-time traffic information storage 122, when the network server 140 requests data, and generates information required to guide the vehicle to the optimum route. The network server 140 connects the information center 100 to the wireless communication network 200.

As described above, the information center 100 stores the map data and the real-time traffic information, generates information about an optimum route between the present position and the destination for the mobile terminal based on map data and real-time traffic information, and transmits the optimum route information to the wireless communication network 200.

The wireless communication network 200 provides information about the present position and destination of the vehicle received from the mobile terminal 300 to the information center 100. Upon request of downloading from the mobile terminal 300, the wireless communication network 200 transmits the optimum route information to the mobile terminal 300. This wireless communication network 200 can be built with an existing digital cellular system or PCS system. Additionally, an IMT-2000 system can be used as the wireless communication network 200.

Figure 8:
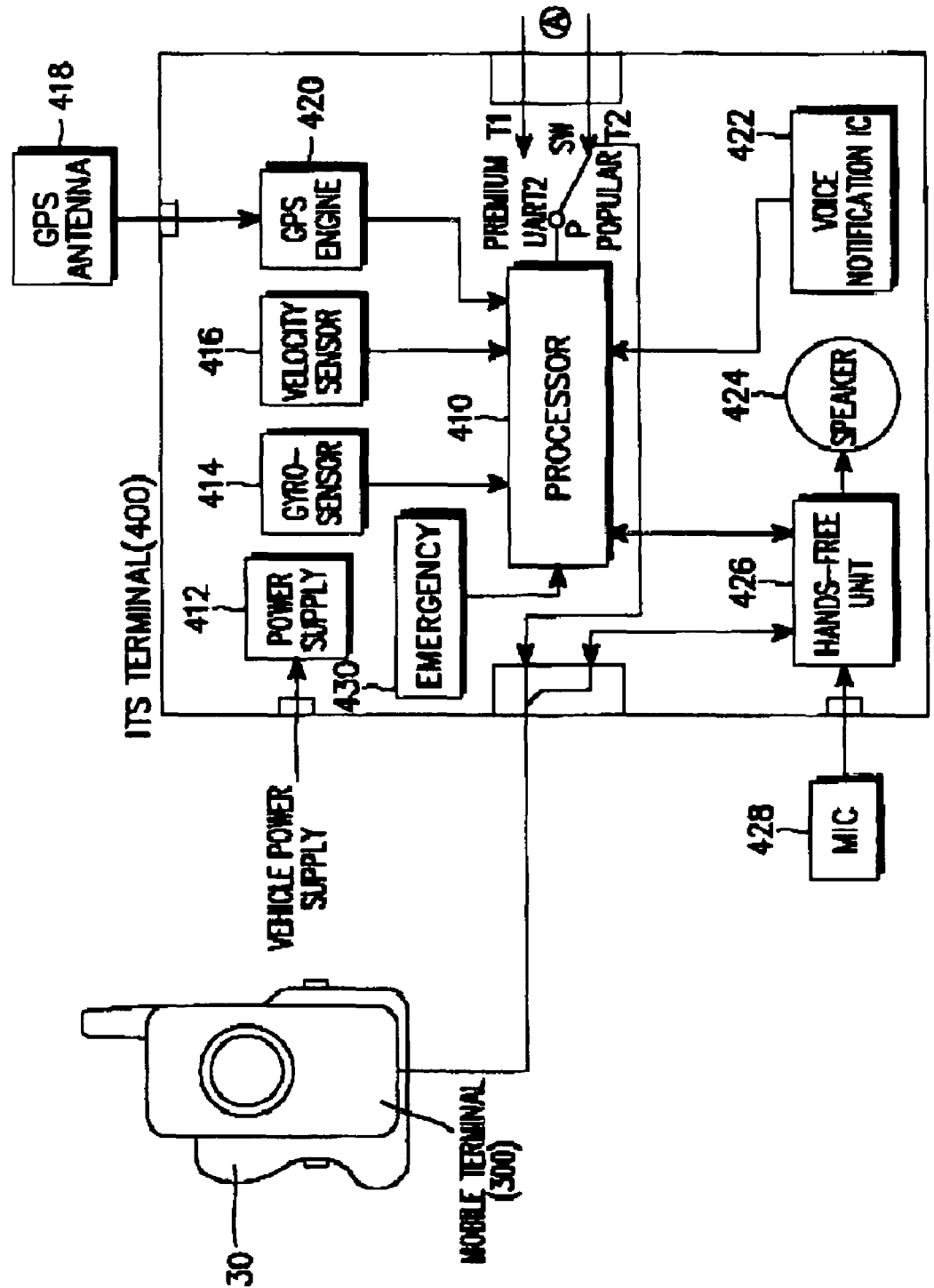
FIG. 8 is a detailed block diagram of an ITS terminal according to the present invention.

FIG. 8 illustrates the structure of the ITS terminal 400.

Referring to FIG. 8, the ITS terminal 400 includes a processor 410, a power supply 412, a gyro-sensor 414, a velocity sensor 416, a GPS antenna 418, a GPS engine 420, a voice notification IC (Integrated Circuit) 422, a speaker 424, a hands-free unit 426, a microphone (Mic) 428, and an emergency processor 430.

The power supply 412 receives a power voltage from the vehicle and supplies it to all components of the ITS terminal 400. The power supply 412 has a charging circuit (not shown) and charges a battery (not shown) in the mobile terminal 300 under the control of the processor 410. An existing charging circuit can be used as the charging circuit.

The gyro-sensor 414 senses the driving angle of the vehicle. The velocity sensor 416 senses the velocity of the vehicle. The GPS antenna 418 receives signals from GPS satellites. The GPS engine 420 calculates the present pseudo-position coordinates of the vehicle from the received signals. The processor 410 calculates the present pseudo-position of the vehicle based on the driving angle and velocity of the vehicle received from the sensors 414 and 416 and selects one of this calculated pseudo-position and the pseudo-coordinates received from the GPS engine 420. If an accumulation error of the sensors 414 and 416 is small, the processor 410 selects its calculated pseudo-position. If the accumulation error is large, it compensates the accumulation error with the value received from the GPS engine 420.

The voice notification IC 422 announces navigation-related messages by voice according to the present invention. The IC 422 stores voice data shown in FIG. 20 and outputs voice data for optimum route guidance through the speaker 424.

The speaker 424 and the microphone 428 interface between the ITS terminal 400 and the mobile terminal 300. The hands-free unit 426, connected between the speaker 424 and the microphone 428, helps the user of the mobile terminal 300 with a hands-free call. The voice of the user is input through the microphone 428. Through the speaker 424, the voice of the other party is output in a voice call mode and a route guidance message generated from the voice notification IC 422 is output in a navigation mode.

The emergency processor 430 generates a corresponding signal in case of emergency. The emergency is determined when the user presses a particular button on the ITS terminal 400 to notify the emergency. That is, the emergency processor 430 includes the particular button and outputs a signal indicating the emergency when the user presses the button.

Figure 19:
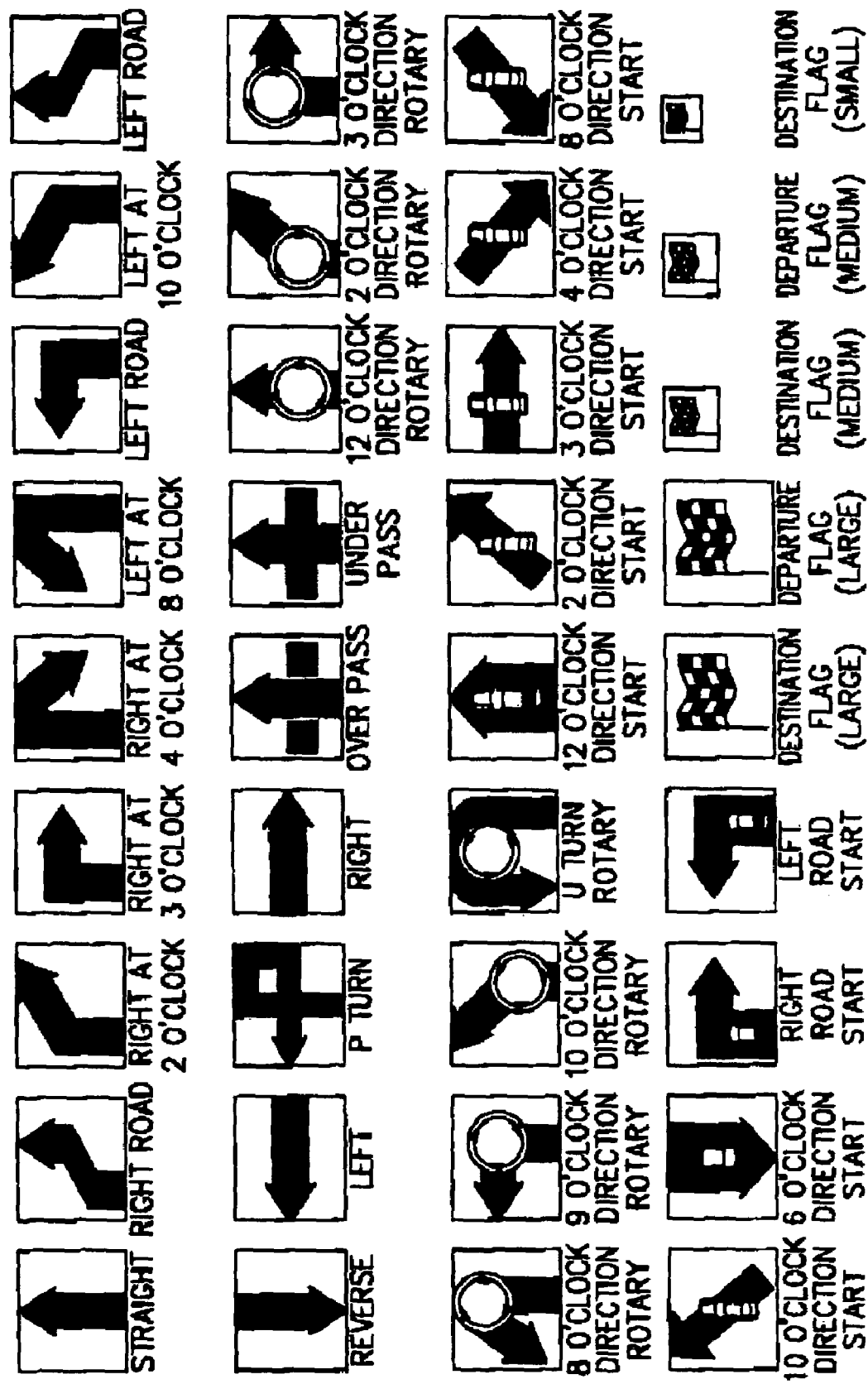
FIG. 19 illustrates a set of intersection image examples used for route guidance according to the present invention.

The processor 410 provides overall control to the operation of the ITS terminal 400 according to the present invention. The control operations include calculation of the present vehicle position, data transmission between the ITS terminal 400 and the mobile terminal 300, control of the hands-free unit 426, charging the mobile terminal 300, and emergency processing. The processor 410 implements the above control operations and stores necessary control programs. The processor 410 also has an internal memory (not shown) for temporarily storing data processed during the operations. In particular, the memory stores image data as shown in FIG. 19.

The processor 410 is provided with a first port (UART1: Universal Asynchronous Receiver and Transmitter 1) and a second port (UART2). The processor 410 is connected to the GPS engine 420 via the UART1 and to the mobile terminal 300 via the UART2. The TFT-LCD 40 shown in FIG. 9 can also be connected to the processor 410 via the UART2. In other words, a single-pole double-through switch (SW) having a single input port p and two output ports T1 and T2 is connected to the UART2 of the processor 410. In the case of a popular navigation system without the TFT-LCD unit 40 at the ITS terminal 400, the port p of the switch is connected to the port T2 which is connected to the mobile terminal 300. On the other hand, in the case of a premium navigation system with the TFT-LCD 40 at the ITS terminal 400, the port P of the switch is connected to the UART1 of a CPU 440 of the TFT-LCD unit 40 via the port T1 and the port T2 of the switch is connected to the UART2 of the TFT-LCD unit 40 and the mobile terminal 300.

Figure 9:
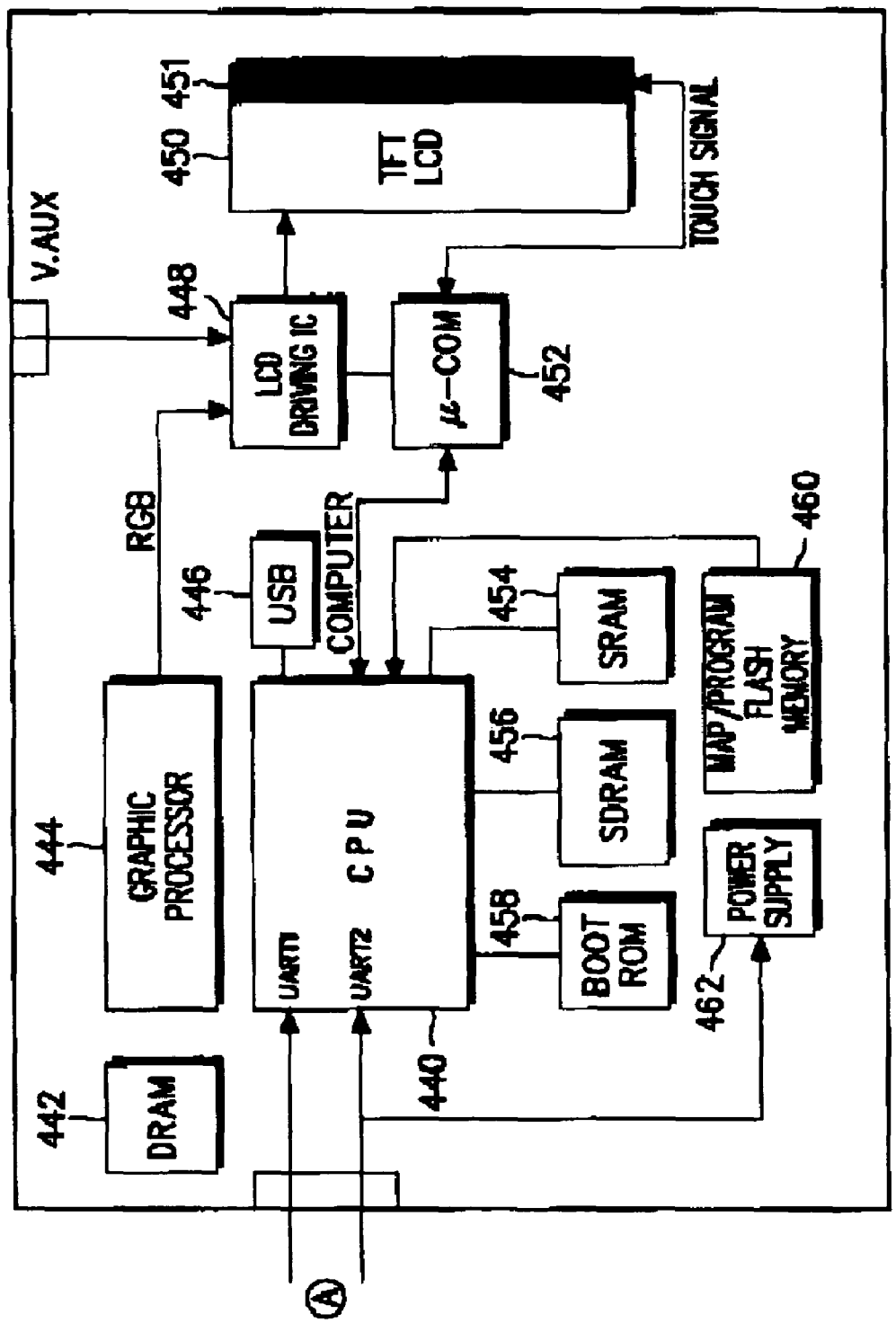
FIG. 9 is a detailed block diagram of TFT-LCD unit shown in FIG. 6.

FIG. 9 is a detailed block diagram of the TFT-LCD unit 40 shown in FIG. 6.

Referring to FIG. 9, the TFT-LCD unit 40 includes the CPU 440, a DRAM (Dynamic RAM) 442, a graphic processor 444, a USB (Universal Serial Bus) port 446, an LCD driving IC 448, a TFT-LCD 450, a microcomputer (μ-com) 452, an SRAM (Static RAM) 454, an SDRAM (Synchronous DRAM) 456, a boot ROM 458, a flash memory 460, and a power supply 462.

The DRAM 442 is a graphic memory for storing data to be processed in the graphic processor 444. An 8-Mbyte SDRAM can be used as the DRAM 442. The SRAM 454 temporarily stores data processed by the CPU 440. The SDRAM 456 is a main system memory for the CPU 440. The boot ROM 458 stores a booting program, an operating system (OS), hardware drivers, application programs, fonts, and icons. The flash memory 460 stores map data and a program to implement a navigation function. The USB port 446 is a port through which map data and a navigation program are input externally. Here, external devices include a laptop computer having a USB port or a desktop PC having a USB port. The power supply 462 supplies power voltages, for example, 9, 5, 3.3, and 1.8V to each component of the TFT-LCD unit 40. The TFT-LCD 450 can be a 5.8-inch wide TFT-LCD. A touch screen 451 is mounted to the TFT-LCD 450 to allow the user to select a particular waypoint on a map. The LCD driving IC 448 controls driving of the TFT-LCD 450. It drives the TFT-LCD 450 in response to an RGB signal received from the graphic processor 444 and a composite video signal received through an external video signal port V.AUX. The graphic processor 444 processes graphic images to be displayed on the TFT-LCD 450, that is, an RGB signal. The microcomputer 452 receives a signal from the touch screen 451 and feeds the received signal to the CPU 440. The CPU 440 provides overall control to the TFT-LCD unit 40. That is, the CPU 440 processes input data, graphic images, a navigation program, and map data. The CPU 440 has a web browser.

The thus-constituted TFT-LCD unit 40 is mounted to the ITS terminal 400 as an essential component to a premium navigation system. The premium navigation system has a flash memory for storing map data and a TFT-LCD for displaying the map data. Therefore, the premium navigation system advantageously allows the user to view map information though it is rather expensive.

The navigation system according to the present invention, including the information center 100, the wireless communication network 200, the mobile terminal 300, and the ITS terminal 400 shown in FIGS. 4 to 9, offers the functions listed in Table 1 below. That is, the user can enjoy the following functions by use of the ITS terminal 400 according to the present invention.

TABLE 1

| Function | Features |
|---|---|
| Navigation (route guidance) | high performance hybrid navigation various destinations setting optimum route guidance route calculation reflecting real-time traffic information map information updated everyday |
| In-vicinity facilities search | gas stations, resting stops, fixing centers, banks, drugstores, lodging, places for sightseeing, restaurants, coffee shops, cinemas, theaters, etc. |
| Traffic information | what is ahead, downtown, state roads, expressways, book-marked waypoints, etc. |
| Daily living information | news, weather, travel, TV broadcasts, movies, plays, performances, horoscope, humorous, tips, etc. |
| Emergency | first aid in emergency |
| Hands-free | hands-free call and charging |

Besides the typical navigation functions of route guidance and traffic information, the navigation system according to the present invention additionally offers the functions of in-vicinity facility search, daily living information, first aid in emergency, and hands-free calling, as shown in Table 1.

A description of route guidance in the navigation system according to the present invention will be given below. The route guidance is provided by use of the information center 100, the wireless communication network 200, the mobile terminal 300, and the ITS terminal 400 as described before.

Figure 10:
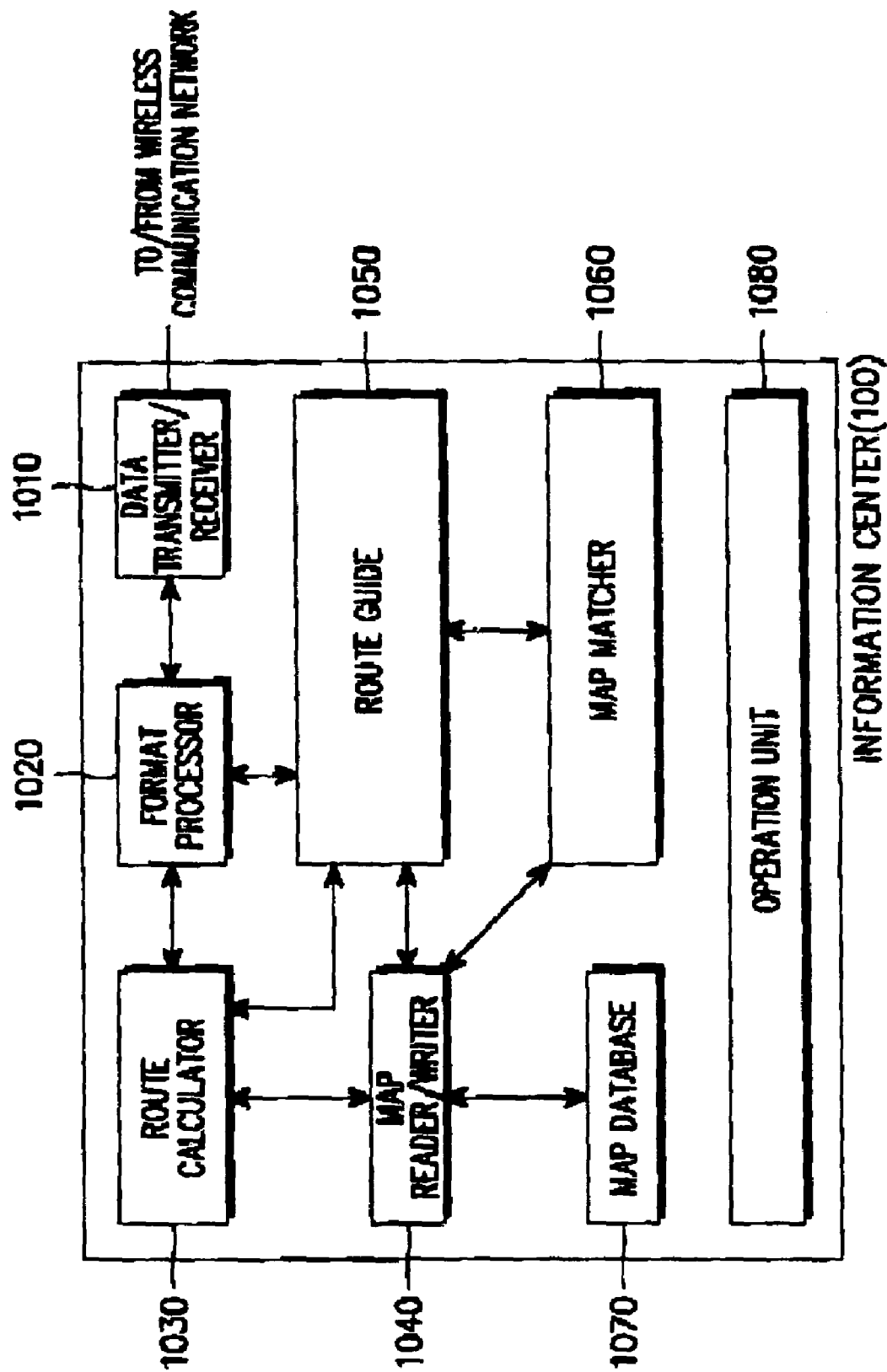
FIG. 10 is a function block diagram of the information center to provide a route guidance function according to the present invention.

FIG. 10 is a block diagram of the information center 100 for route guidance according to the present invention.

Referring to FIG. 10, the information center 100 includes a transmitter/receiver 1010, a format processor 1020, a route calculator 1030, a map reader/writer 1040, a route guide 1050, a map matcher 1060, a map database 1070, and an operation unit 1080.

The transmitter/receiver 1010 converts a transmission signal to a signal suitable for the wireless communication network 200 prior to transmission and receives a signal from the wireless communication network 200. The format processor 1020 converts data in a preset format between the information center 100 and the wireless communication network 200 and interprets a signal received from the transmitter/receiver 1010 according to the preset format. The route calculator 1030 calculates an optimum route between two given points, that is, between the present position and a destination. The map database 1070 is a CD-ROM or a memory for storing maps.

The map reader/writer 1040 reads a necessary map from the map database 1070 and writes the map in the map database 1070. The map reader/writer 1040 updates the map in real time. The route guide 1050 extracts turning points, bearing, and reference information along the optimum route calculated by the route calculator 1030. That is, the route guide 1050 functions to extract data necessary for a route guide 1150 (see FIG. 11) of a navigation terminal which will be later described. The map matcher 1060 pinpoints received coordinates on a map. The operation unit 1080 is a block for operating and managing the information center 100.

The transmitter/receiver 1010 and the format processor 1020 correspond to the network server 140 shown in FIG. 7, the route calculator 1030, the route guide 1050, and the map matcher 1060 correspond to the route calculation server 130, the map reader/writer 1040 corresponds to the computer 110, and the map database 1070 corresponds to the map data storage 112.

Figure 11:
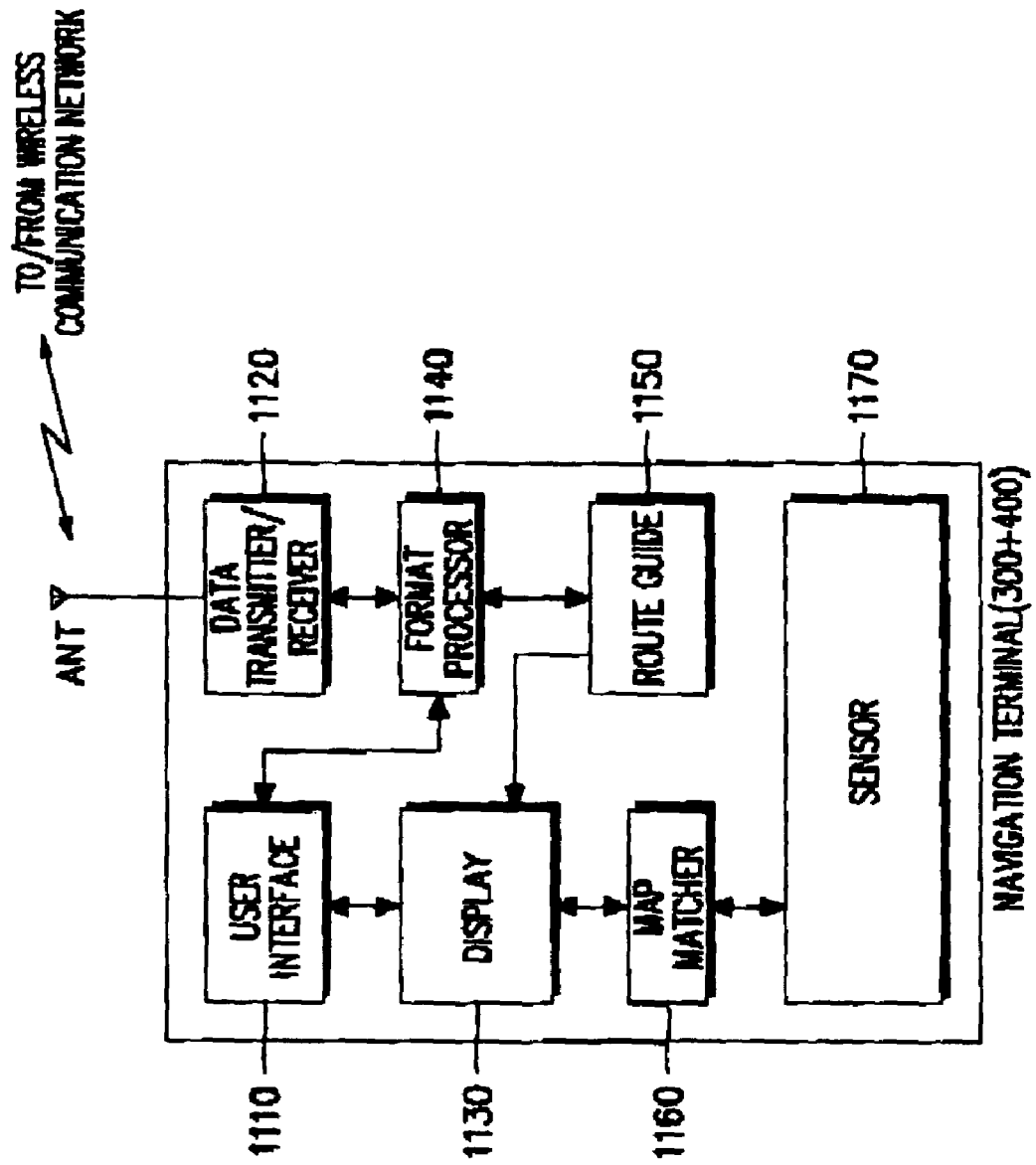
FIG. 11 is a function block diagram of the mobile terminal and the ITS terminal for route guidance according to the present invention.

FIG. 11 is a block diagram of a navigation terminal having the mobile terminal 300 and the ITS terminal 400 in combination for route guidance according to the present invention. While the mobile terminal 300 and the ITS terminal 400 are separated in FIG. 4, these terminals can be integrated into a single terminal as mentioned before. In addition, in view of interworking between the mobile terminal 300 and the ITS terminal 400 for route guidance according to the present invention, they are shown to be incorporated into one terminal in the aspect of navigation in FIG. 11. For clarity of description, the mobile terminal 300 and the ITS terminal 400 in combination are termed a navigation terminal.

Referring to FIG. 11, the navigation terminal includes a user interface 1110, a data transmitter/receiver 1120, a display 1130, a format processor 1140, the route guide 1150, a map matcher 1160, and a sensor 1170.

The user interface 1110 serves as an input portion for receiving a user request related with setting a navigation mode and setting a starting point and an ending point in a navigation mode. The user interface 1110 interfaces the user with the information center 100. The display 1130 also interfaces the user with the information center 100 like the user interface 1110 by displaying a map, a destination, and routes during the navigation operation. The transmitter/receiver 1120 exchanges signals with the wireless communication network 200. The format processor 1140 converts data according to the preset format preset between the wireless communication network 200 and the information center 100 and interprets a signal received from the transmitter/receiver 1120 according to the preset format. The route guide 1150, corresponding to the route guide 1050 of FIG. 10, guides the navigation terminal to a route and processes route guidance data. The sensor 1170 extracts data required for vehicle tracking. The map matcher 1160 pinpoints the varying positions of the vehicle on a map by comparing the route guidance data received from the information center 100 with position data received from the sensor 1170.

The user interface 1110 corresponds to a keypad of the mobile terminal 300 or the touch screen in a premium navigation system. The display 1130 corresponds to the display of the mobile terminal or the TFT-LCD 450 of the premium navigation system. The transmitter/receiver 1120 corresponds to the transmitter/receiver of the mobile terminal. The format processor 1140, the route guide 1150, and the map matcher 1160 correspond to the processor 410 shown in FIG. 8. The sensor 1170 corresponds to the GPS antenna 418, the GPS engine 420, the gyro-sensor 414, and the velocity sensor 416 of FIG. 8.

As described above, the navigation terminal in the navigation system according to the present invention is provided with the user interface 1110, the format processor 1140, the route guide 1150, the map matcher 1160, and the sensor 1170, for guiding the user to an optimum route based on information received from the information center 100.

For route guidance in the navigation system, a user request is transmitted to the information center 100 via the navigation terminal and the wireless communication network 200. The information center 100 recognizes the user request, generates suitable data, and transmits it to the navigation terminal via the wireless communication network 200. Here, the navigation terminal transmits all related information required to request route guidance such as a destination to the information center 100, and the information center 100 generates needed data internally and transmits it to the navigation terminal via the wireless communication network 200.

The information related with route guidance can be requested through the user interface 1110 and the display 1130. The route guidance request information is formatted in the format processor 1140 and transmitted to the wireless communication network 200 via the transmitter/receiver 1120.

The transmitter/receiver 1010 of the information center 100 receives the route guidance request information and the format processor 1020 interprets the route guidance request information. The interpreted route guidance information is fed to the route calculator 1030 and the route guide 1050. Then the route calculator 1030 calculates an optimum route based on map data from the map database 1070 and the map reader/writer 1040, and acquires data needed for guidance to the calculated optimum route from the map matcher 1060, the map reader/writer 1040, and the map database 1070. The route guidance data is formatted in the format processor 1020 and transmitted to the transmitter/receiver 1120 of the navigation terminal via the transmitter/receiver 1010 and the wireless communication network 200.

The received route guidance data is interpreted in the format processor 1140 of the navigation terminal. The route guide 1150 generates route guidance data such as distance to a guide waypoint, bearing, on track or off track, time to go, and distance to go based on the present position data obtained by the sensor 1170 and the map matcher 1160 and the route guidance data received from the format processor 1140 and displays the generated data on the display 1130, while outputting it to the user by voice. Thus the user can reach the destination along the guided optimum route.

Figure 12:
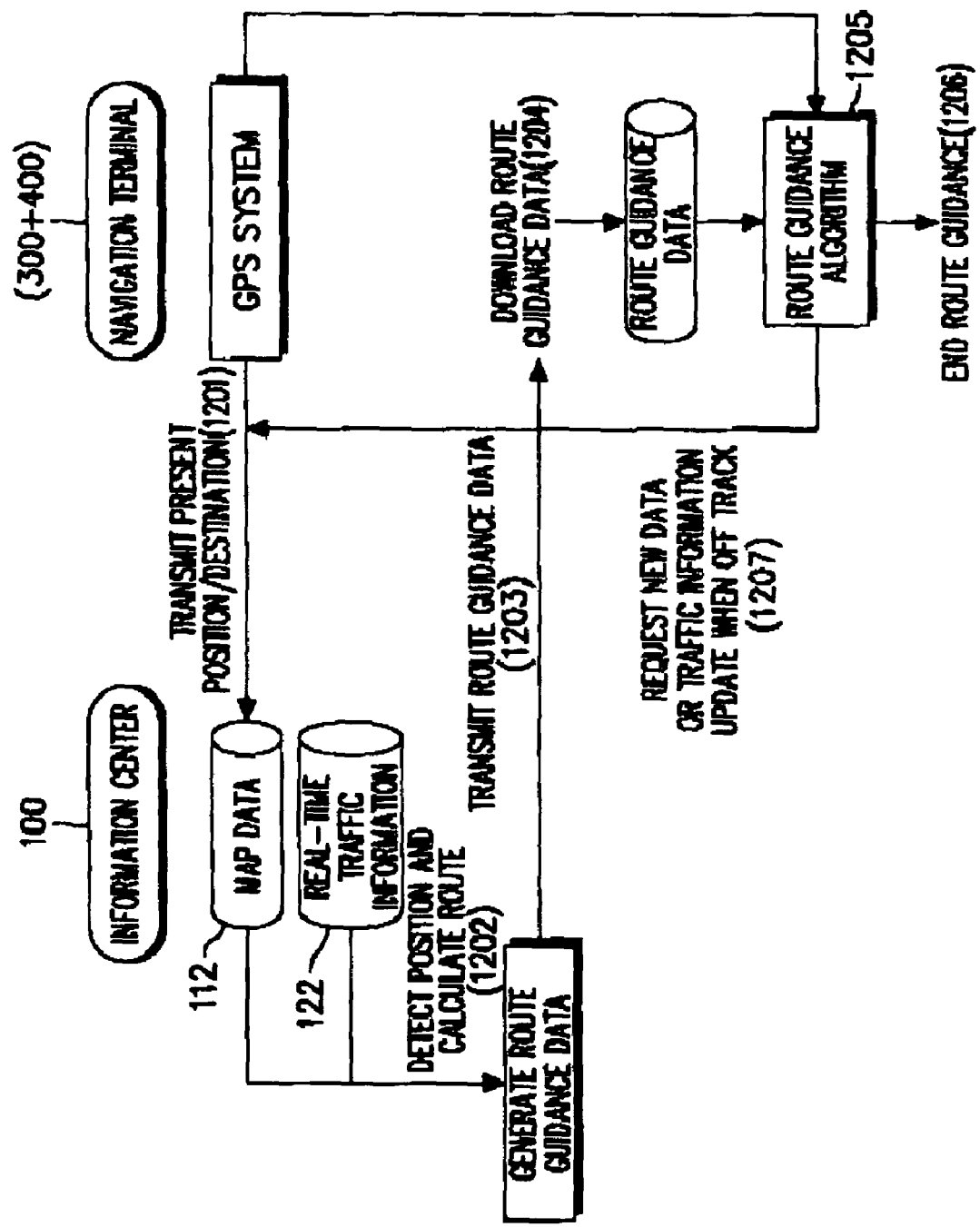
FIG. 12 illustrates a route guidance procedure in the navigation system according to the present invention.

FIG. 12 is a flowchart illustrating the route guiding procedure in the navigation system according to the present invention.

Referring to FIG. 12, the navigation terminal transmits information about the present position and destination of the vehicle to the information center 100 via the wireless communication network 200 in step 1201. The present vehicle position is expressed in a latitude and longitude coordinate calculated by the GPS engine of the navigation terminal and the destination is the name of a facility or an administrative district input to the navigation terminal by characters or voice by the user. The destination information can also be a local category or a phone number.

In step 1202, the information center 100 detects the present position and calculates routes based on the present position and destination information. The information center 100 searches for a geographical place/facility corresponding to the received present position information from the map data storage 112 and expresses it in a latitude and longitude coordinate. An optimum route leading to the destination is calculated based on the received present position and destination information received from the map data storage 112 and the real-time traffic information storage 122. The optimum route information is built into route guidance data.

In step 1203, the information center 100 transmits the route guidance data to the navigation terminal via the wireless communication network 200. For example, the route guidance data may reach up to 200 Kbytes. The navigation terminal downloads the route guidance data in step 1204. The downloaded route guidance data is stored in the RAM of the mobile terminal.

In step 1205, the navigation terminal checks the stored route guidance data and the location of the vehicle tracked by the GPS engine 420, the gyro-sensor 414, and the velocity sensor 416 every predetermined time period, displays a direction in which the vehicle is to travel on the display 1130 of FIG. 11, and announces a notification message under the control of the voice notification IC 422 of FIG. 8.

If the vehicle takes a wrong path during the operation in step 1205, the navigation terminal requests new route guidance data or update of traffic information in step 1207. That is, if it is determined that the vehicle travels along a wrong path during step 1205, the navigation terminal transmits the changed location of the vehicle to the information center 100 to thereby request new route guidance data.

If the vehicle reaches the destination, the route guidance is terminated in step 1206.

The above-described route guidance operation according to the present invention can be considered in three stages: basic operation, operation during driving, and operation of the information center.

1.) Basic Operation

This operation includes the steps of selecting a navigation function in the navigation terminal, connecting the navigation terminal to the information center 100, transmitting the present vehicle position and destination data to the information center 100, checking the received service data in the information center 100, calculating an optimum route and generating route guidance data in the information center 100, and transmitting the route guidance data from the information center 100 to the navigation terminal.

2.) Operation During Driving

The route guidance data is stored in the memory of the navigation terminal. The navigation terminal generates the present position data of the vehicle by the GPS engine, the gyro-sensor, and the velocity sensor. The navigation terminal compares the present position with the route guidance data received from the information center 100 in real time and guides the vehicle to the destination. The route guidance operation ends when the present position of the vehicle is the same as the destination.

Meanwhile, if a tracking error is generated due to the difference between the present position data of the vehicle during driving and the position data derived from the route guidance data received from the information center 100, the navigation terminal is reconnected to the information center 100 considering that the vehicle took a wrong path, transmits the changed present position data of the vehicle, and requests new route guidance data to the information center 100.

3.) Operation of the Information Center

Upon receipt of the data from the navigation terminal, the information center 100 checks whether the user of the navigation terminal is registered. If the user is authenticated, the information center 100 checks the present position and destination of the vehicle from the received data. The information center 100 calculates an optimum route from the present position to the destination referring to the map database and the real-time traffic information database and generates route guidance data to guide the vehicle to the optimum route. Then, the information center 100 transmits the route guidance data to the navigation terminal.

Figure 13:
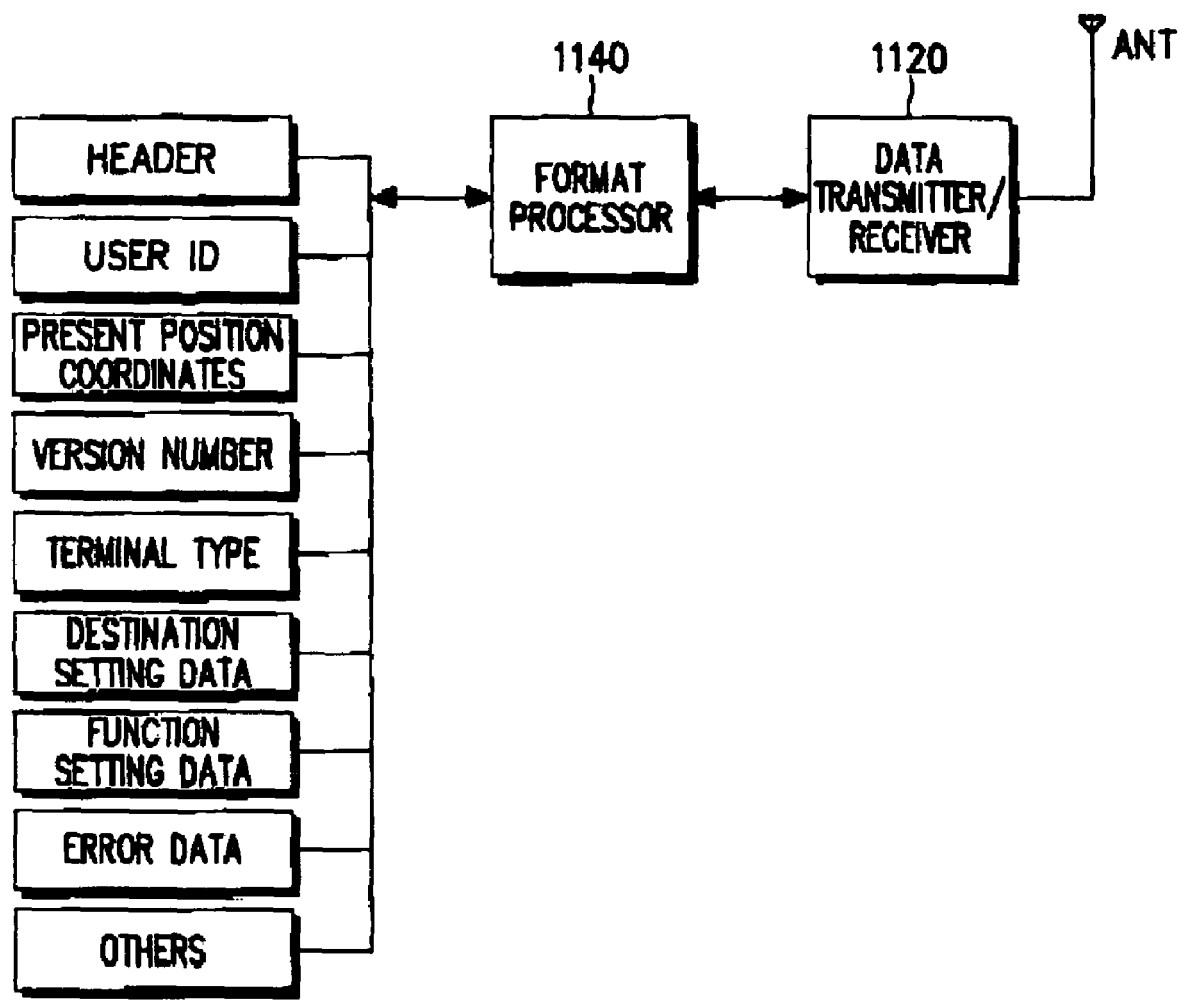
FIG. 13 illustrates the structure of route guidance request data transmitted from the navigation terminal to the information center over the wireless communication network according to the present invention.

FIG. 13 illustrates the structure of route guidance request data transmitted from the navigation terminal to the information center 100 through the wireless communication network 200 according to the present invention.

Referring to FIG. 13, the format processor 1140 of the navigation terminal receives data comprised of header, user ID (Identification), coordinates of the present position, version number, a terminal type, destination setting data, function setting data, and error data, and formats the received data. The transmitter/receiver 1120 converts the formatted data to a signal suitable for transmission and transmits the converted transmission signal through the antenna ANT. The transmission signal reaches the information center 100 through the wireless communication network 200. The header indicates that the data is a route guidance request. The user ID is information used to authenticate a subscriber as registered for a navigation service. The present position coordinates are expressed in latitude and longitude calculated by the GPS device in the navigation terminal and the destination data is input from the user by characters (text) or by voice via the navigation terminal. The terminal type is information indicative of the size and type of a terminal display on which the route guidance is requested and route guidance data is to be displayed.

Figure 14:
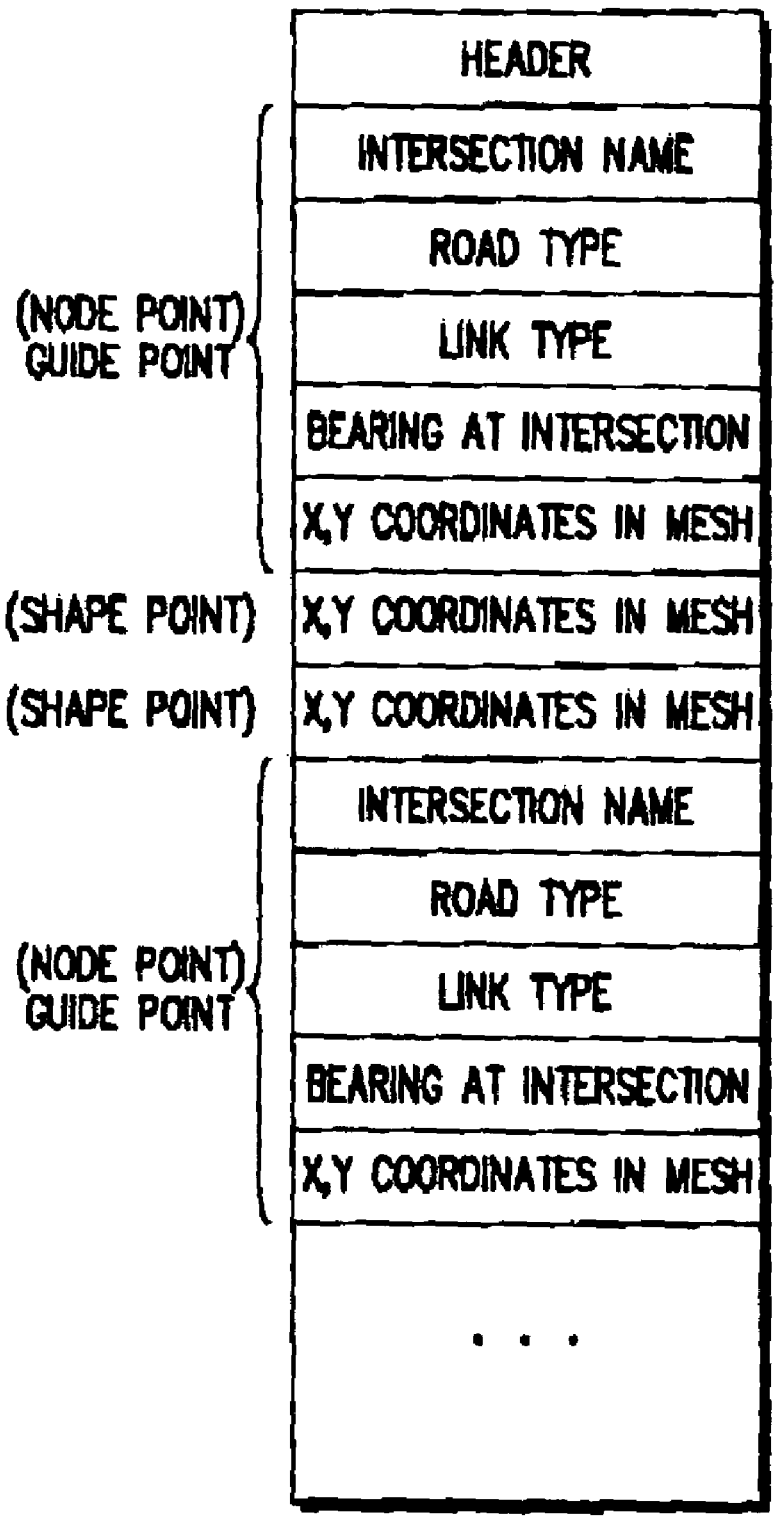
FIG. 14 illustrates the structure of route guidance data according to the present invention.

FIG. 14 illustrates the structure of route guidance data according to the present invention.

Referring to FIG. 14, the route guidance data is comprised of a header, guide points (node points), and shape points. The guide point information includes the name of an intersection, a road type, a link type, a bearing which the vehicle is to take at the intersection, and an X and Y coordinate in a mesh. The intersection name is in text data such as "the intersection of Pasadena Avenue and Walnut Street". The road type indicates a road class like highway, freeway, or local road. The link type includes U-turn, rotary, over pass, under pass, bridge, and etc. The bearings of the vehicle include in, out, left, and right.

Figure 15:
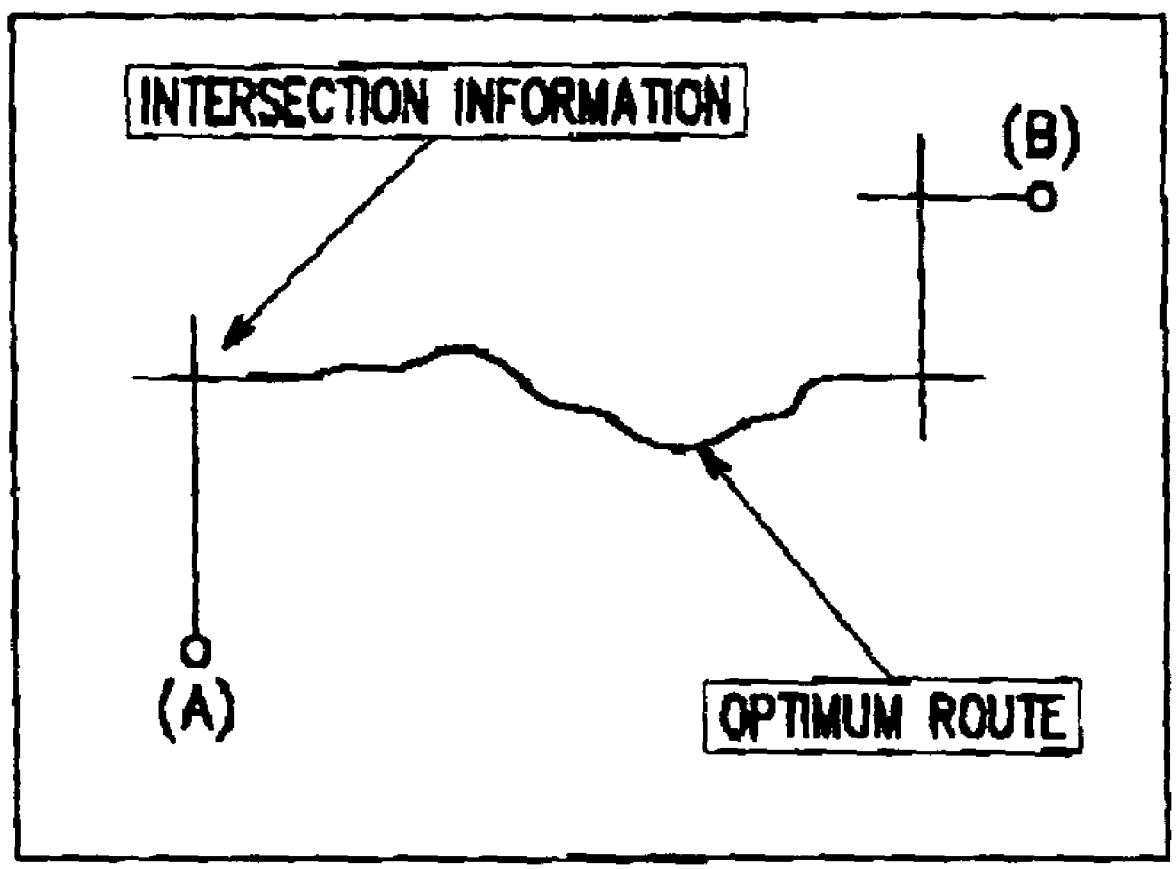
FIG. 15 illustrates an embodiment of a route guidance data generation method according to the present invention.
Figure 16:
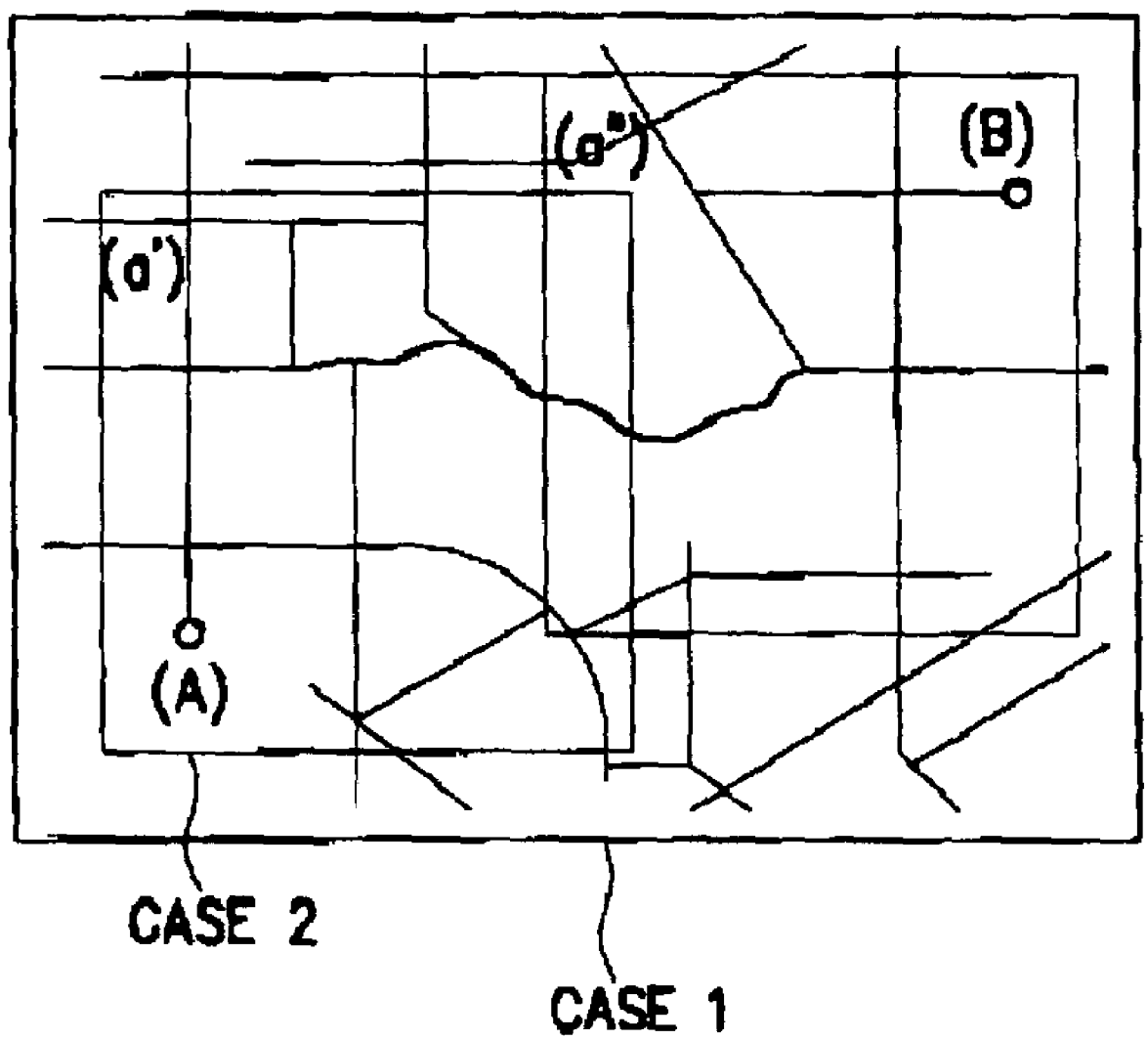
FIG. 16 illustrates another embodiment of the route guidance data generation method according to the present invention.

FIGS. 15 and 16 are views referred to for describing a route guidance data generation method according to the present invention.

Referring to FIG. 15, route guidance data is built out of related information on links and nodes in an optimum route between a present position A and a destination B.

Referring to FIG. 16, related information about links and nodes a' and a" within a particular geographic region including part or the whole of the optimum route between the present position A and the destination B is generated as route guidance data. Case 1 represents route guidance data including information about all links and nodes in a geographic region covering the whole optimum route and Case 2 represents route guidance data including information about links and nodes in a geographic region covering only part of the optimum route.

Figure 17:
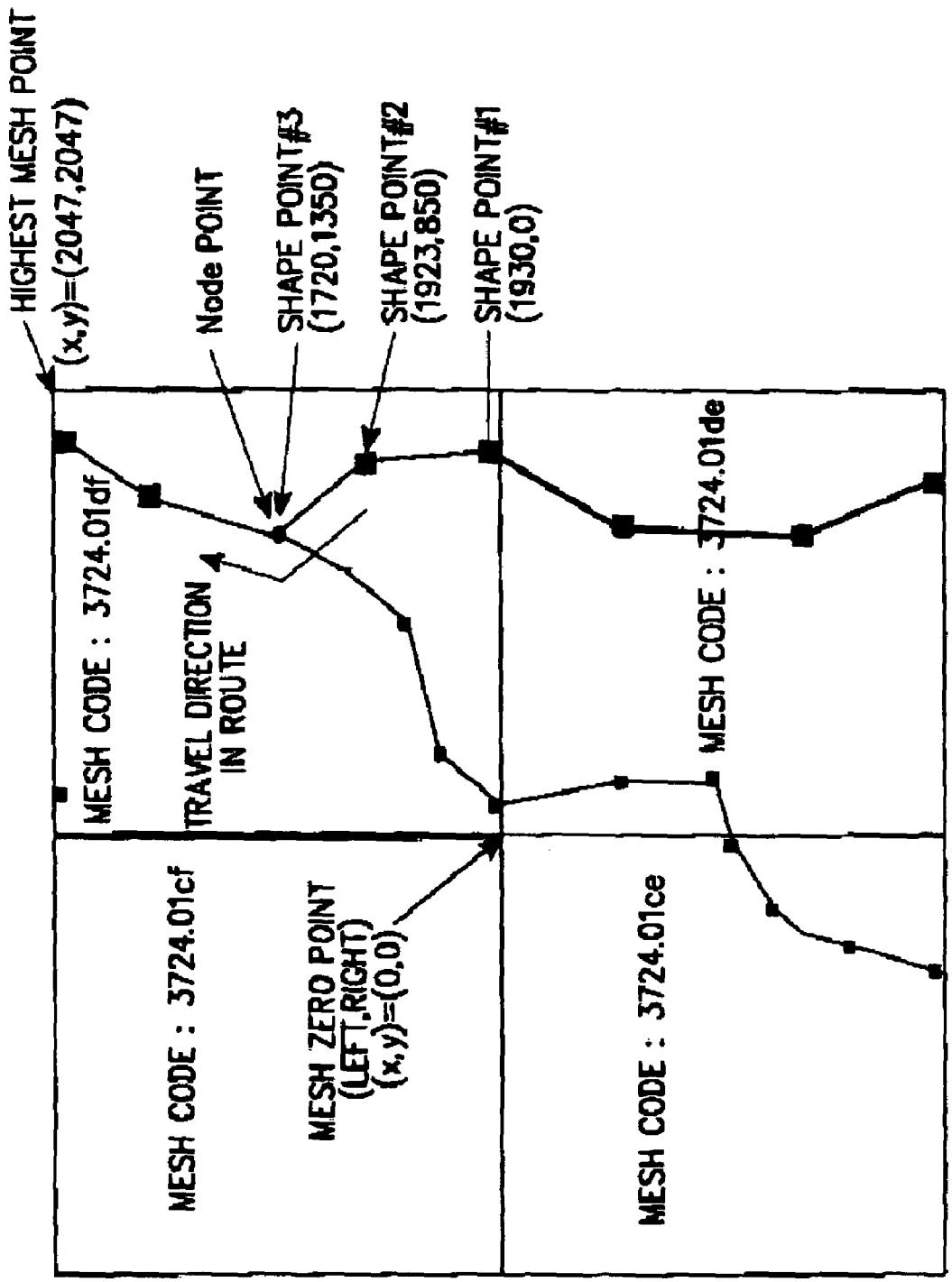
FIG. 17 illustrates a route guidance data mesh system according to the present invention.

FIG. 17 illustrates a route guidance data mesh system according to the present invention.

Referring to FIG. 17, mesh codes are assigned to mesh areas partitioned in meshes by every predetermined longitude and latitude lines. The mesh codes are mapping units because every digital map is constructed with map data based on meshes. A node point is a road junction where a user is guided. A shape point is a waypoint that does not form a road junction but is marked to maintain road linearity. The shape points refer to all waypoints drawn on a map to maintain road linearity. The linearity of an actual road is known from the coordinates of each shape point, which are compared with latitude and longitude coordinates obtained from the GPS device of the navigation terminal. The node point, in other words, is a shape point where two or more linear roads interest.

A guidance code is information necessary for route guidance at a node point, that is, a road junction. That is, the guidance code represents an action required to guide the vehicle's travel, such as left, right, U turn, under pass, over pass, except for going straight. For example, the guidance code can include road code, link code, and bearing code. The road code indicates road type (e.g., highway, freeway, local road, driveway, normal road . . . ). The latitude and longitude coordinates can be expressed as "mesh code+coordinates in the mesh".

The latitude and longitude coordinates of the mesh origin can also be expressed in a mesh code. Its detailed description is avoided because different maps use different formats. The latitude and longitude coordinates of shape points #1, #2, and #3 are detected from the known coordinates of the mesh origin and the highest mesh point. The latitude and longitude coordinates can be expressed as mesh coordinates.

Figure 18:
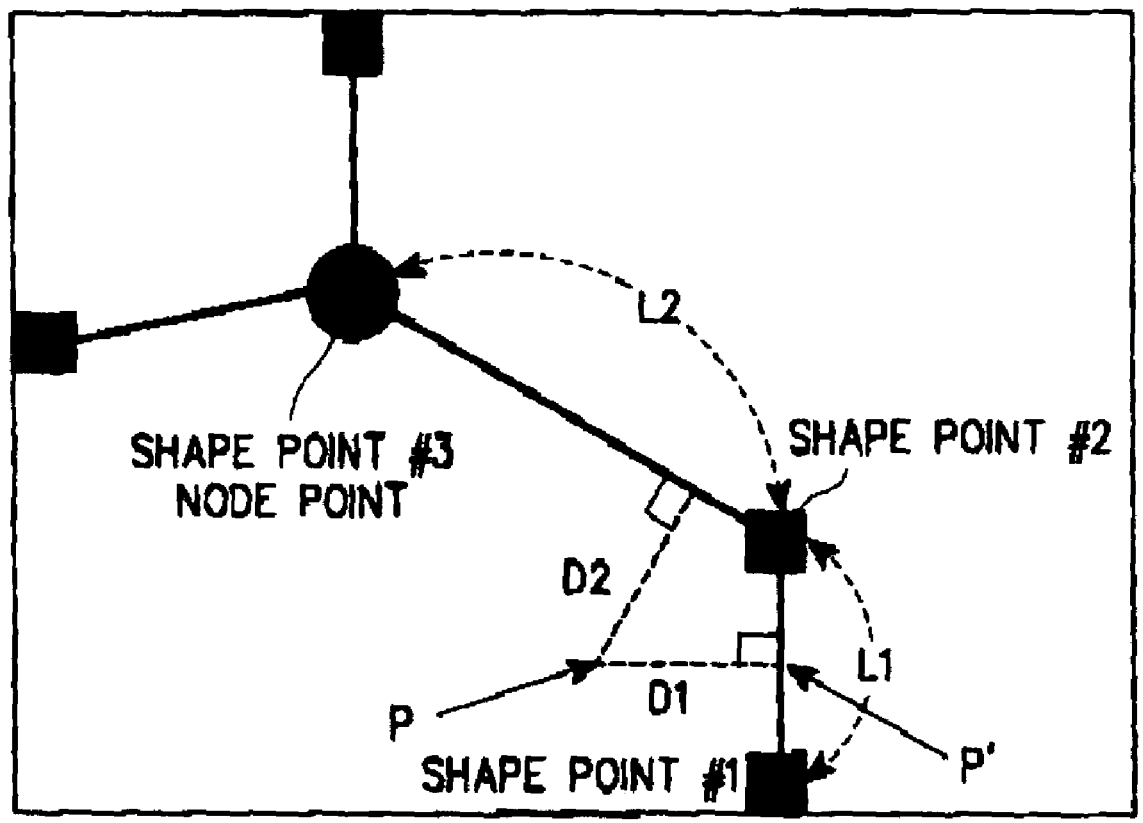
FIG. 18 illustrates map tracking to determine whether a vehicle is off track during route guidance according to the present invention.

FIG. 18 illustrates map tracking to determine whether a vehicle strays off an optimum route according to the present invention.

Referring to FIG. 18, P indicates the present position of the vehicle detected by GPS and P' indicates the present position of the vehicle matched in a route. L1 is the distance between shape point #1 and shape point #2 and L2 is the distance between shape point #2 and shape point #3 which is a node point. D1 is the distance from P to a point on the line L1 perpendicular to P and D2 is the distance from P to a point on the line L2 perpendicular to P. Here route tracking is the process of comparing routes based on the GPS-detected present vehicle position with a position calculated using "mesh code+shape point", determining whether the vehicle strays off the optimum route, and guiding the vehicle to the optimum route using guidance codes at appropriate time.

If D1<D2 and D1<GPS error, it is considered that the present vehicle position is P'. If D1<D2 and D1≧GPS error, it is considered that the vehicle strayed off the optimum route. When the distance to the next guide point, {L2+(distance from shape point #2 to P')} is a predetermined value or less, route guidance is performed.

Every time new coordinates are received from the GPS system, two shape points between which the line is the shortest to the coordinates are determined, the distance between the shape points is calculated, and it is continuously checked whether the distance exceeds the GPS error (threshold). If the distance is less than the GPS error, it is considered that the vehicle is on the track. If the distance is beyond the GPS error, a new present vehicle position is transmitted to the information center 100 along with the existing destination data, considering that the vehicle is off the track and new route guidance data is downloaded.

If it is determined that the vehicle is on the track, the distance between the present position to the next node point is calculated. If the distance is the predetermined value or less, route guidance is performed according to the guidance code of the node point. The route guidance is provided to the user by visual and audible notifications according to the guidance code. For example, the travel direction of the vehicle with the aid of direction arrows, the name of an intersection, and distance to the intersection are displayed on the display of the terminal, while a voice message is announced like "Turn right xx meters ahead". Also, distance to the destination and expected arrival time are displayed.

For example, if a driver travels by roads from Seoul City Hall to Busan City Hall in Korea without passing through highways, 8549 shape points can be marked. Therefore, the volume of route guidance data to be transmitted is about 272 Kbits by 8549 (number of shape points)×4 (bytes: X and Y coordinates and guidance code)+52 (mesh)×4 (bytes: mesh code)=34404 bytes≈34 Kbytes≈272 Kbits. To take another example, if he travels from Seoul City Hall to Busan City Hall by highways, less than 8549 shape points can be marked and thus the required route guidance data is less than 272 Kbits. This data is derived from the navigation map of Samsung Electronics of Korea. The data may vary depending on the format and version of the digital map used. Transmission of the route guidance data for the optimum route between Seoul City Hall and Busan City Hall takes 19 seconds (≈272 Kbit÷14.4 Kbps) in the existing PCS system having a data rate of 14.4 Kbps, whereas it will take less than 2 seconds in IMT-2000 with an initial service rate of 144 Kbps.

FIG. 19 illustrates a set of intersection image examples for use in route guidance according to the present invention.

Referring to FIG. 19, the intersection image data set is composed of 39 images. For example, there are direction images instructing go straight, turn right, turn left, U turn, P turn, over pass, and under pass, direction-at-rotary images representing 12 o'clock direction rotary, 4 o'clock direction rotary, and U-turn rotary, and other images representing starting points and destinations. These image data are stored in an internal memory of the mobile terminal 300 or an internal memory of the processor 410 in the ITS terminal 400 and displayed on the display of the mobile terminal 300 in route guidance.

FIG. 20 illustrates examples of voice data for use in route guidance according to the present invention.

Referring to FIG. 20, the voice data can be generated by the voice notification IC 422 of the ITS terminal 400. For example, the voice data includes "100 m ahead", "200 m ahead", "Turn right", and "2 o'clock direction". The voice data is offered to the driver via the speaker 424 of the ITS terminal 400. In particular, route guidance data output by voice advantageously guides the driver while driving without the risk of a traffic accident, as compared to image route guidance data.

Figure 21:
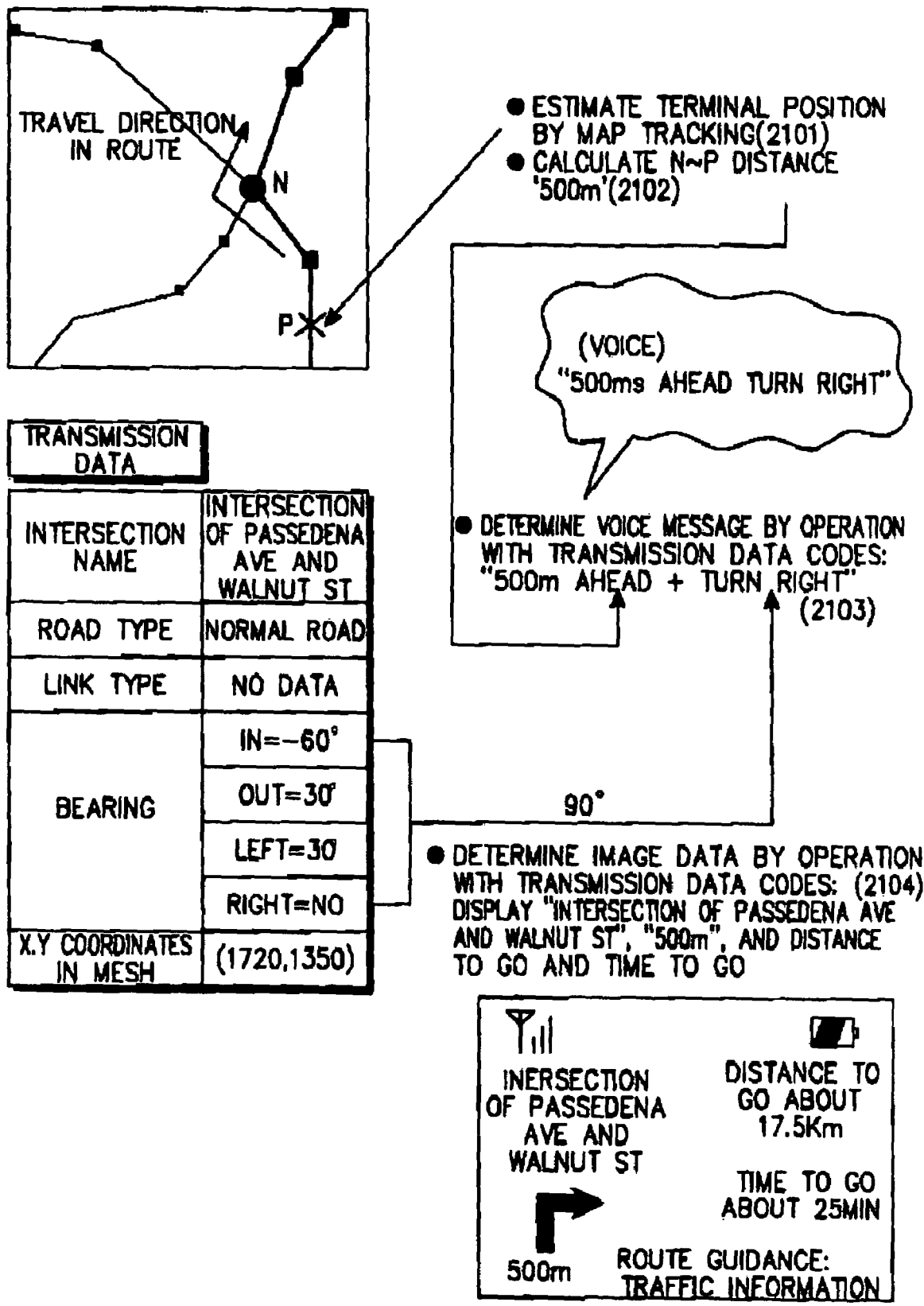
FIG. 21 illustrates an example of route guidance in the navigation terminal according to the present invention.

FIG. 21 illustrates an example of route guidance in the navigation terminal according to the present invention.

Referring to FIG. 21, the navigation terminal estimates its present position by map tracking in step 2101. In step 2102, the navigation terminal calculates the N-P distance. Here, N is a node point (guide point) and P is the estimated present position of the navigation terminal. For example, the navigation terminal is 500 m away from the node point.

The navigation terminal determines a voice notification message to be output corresponding to route guidance data received from the information center 100 in step 2103. According to received data codes, a voice message like "Turn right 500 m ahead" can be output. "500 m" results from step 2102 and "turn right" is obtained from information about bearing at an intersection included in the route guidance data. The bearings are set like "in=−60°", "out=30°", "left=30°", and "right=No".

In step 2104, the navigation terminal determines route guidance data to be displayed on the display and displays it. By operation with transmission data codes, "Intersection of Pasadena Avenue and Walnut Street", "500 m", distance to go, and time to go are displayed.

In the above-described procedure, only data required for route guidance without a large amount of digital map data is received to thereby provide route guidance to a user with real-time traffic information.

FIG. 22 illustrates route guidance menus displayed on the navigation terminal according to the present invention.

Referring to FIG. 22, the menus include set/register, route guide, traffic information, and auxiliary function. The set/register menu includes destination setting and location registration items. The destination setting item has initial display, new setting, delete/amend, add destination, and virtual travel as sub-items. The location registration item has initial display, new setting, and delete/amend as sub-items. The route guidance menu includes route search/guidance, traffic information (automatically updated) notification items. The route search/guidance item in turn has route search, guidance start, re-search as sub-items. The traffic information item has neighborhood, highway section, trunk roads, bridges, and tunnels as sub-items. The auxiliary function menu includes GPS latitude and longitude coordinates, sensor information, and navigation version (check) as items.

Figure 23:
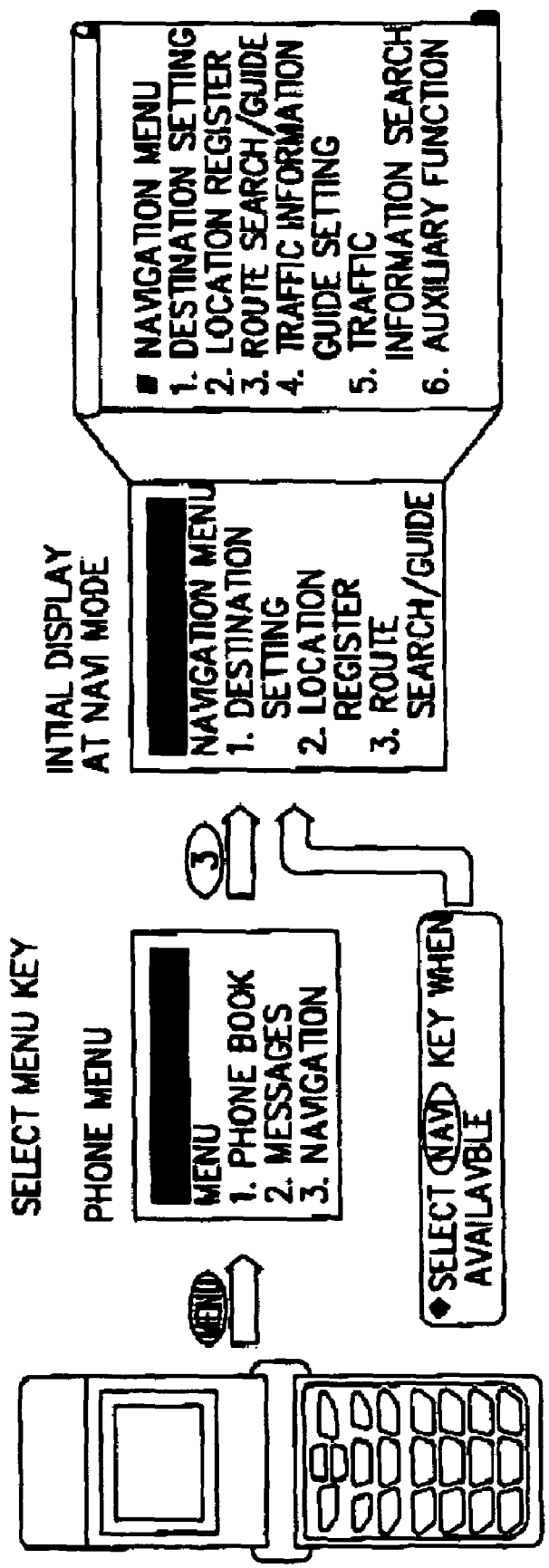
FIG. 23 illustrates an initial display for a navigation mode in the navigation terminal according to the present invention.

FIG. 23 illustrates an initial display in a navigation mode for route guidance in the navigation terminal according to the present invention.

Referring to FIG. 23, the route guidance function is invoked when a navigation menu is selected or a key designated for navigation is pressed. The navigation key can be used as a key for guidance during driving. Then, the initial display for the navigation mode is provided.

Figure 24:
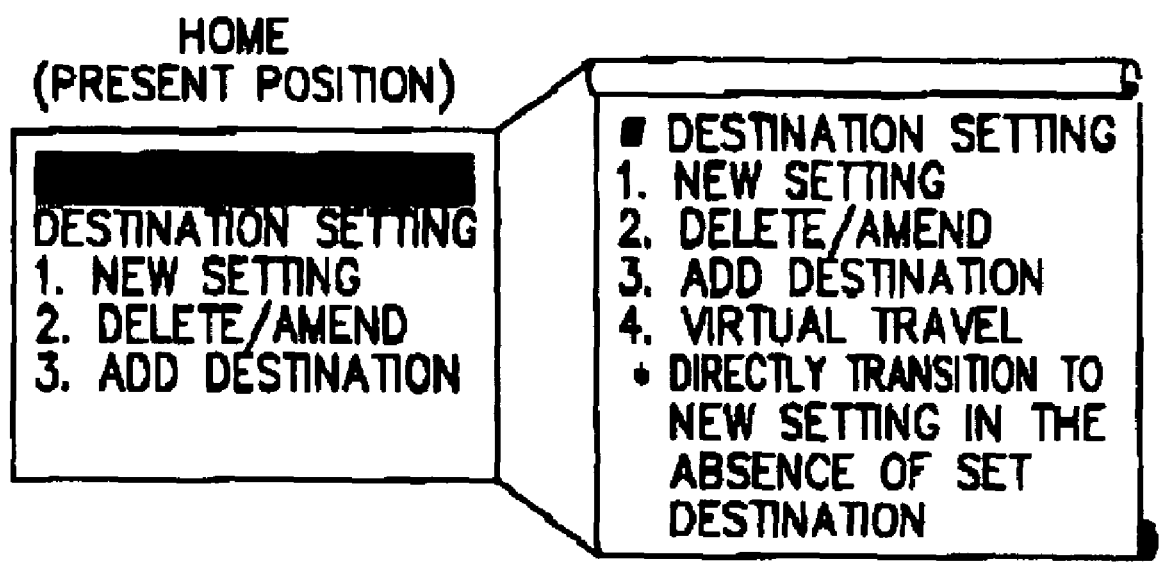
FIG. 24 illustrates a destination setting menu display for route guidance in the navigation terminal according to the present invention.

FIG. 24 illustrates a destination setting menu display in the navigation terminal for route guidance according to the present invention.

Referring to FIG. 24, when a destination setting menu item is selected in the navigation menu shown in FIG. 23, the navigation terminal provides a display having the selectable items of: 1. New Setting, 2. Delete/Amend, 3. Add Destination, 4. Virtual Travel.

Figure 25:
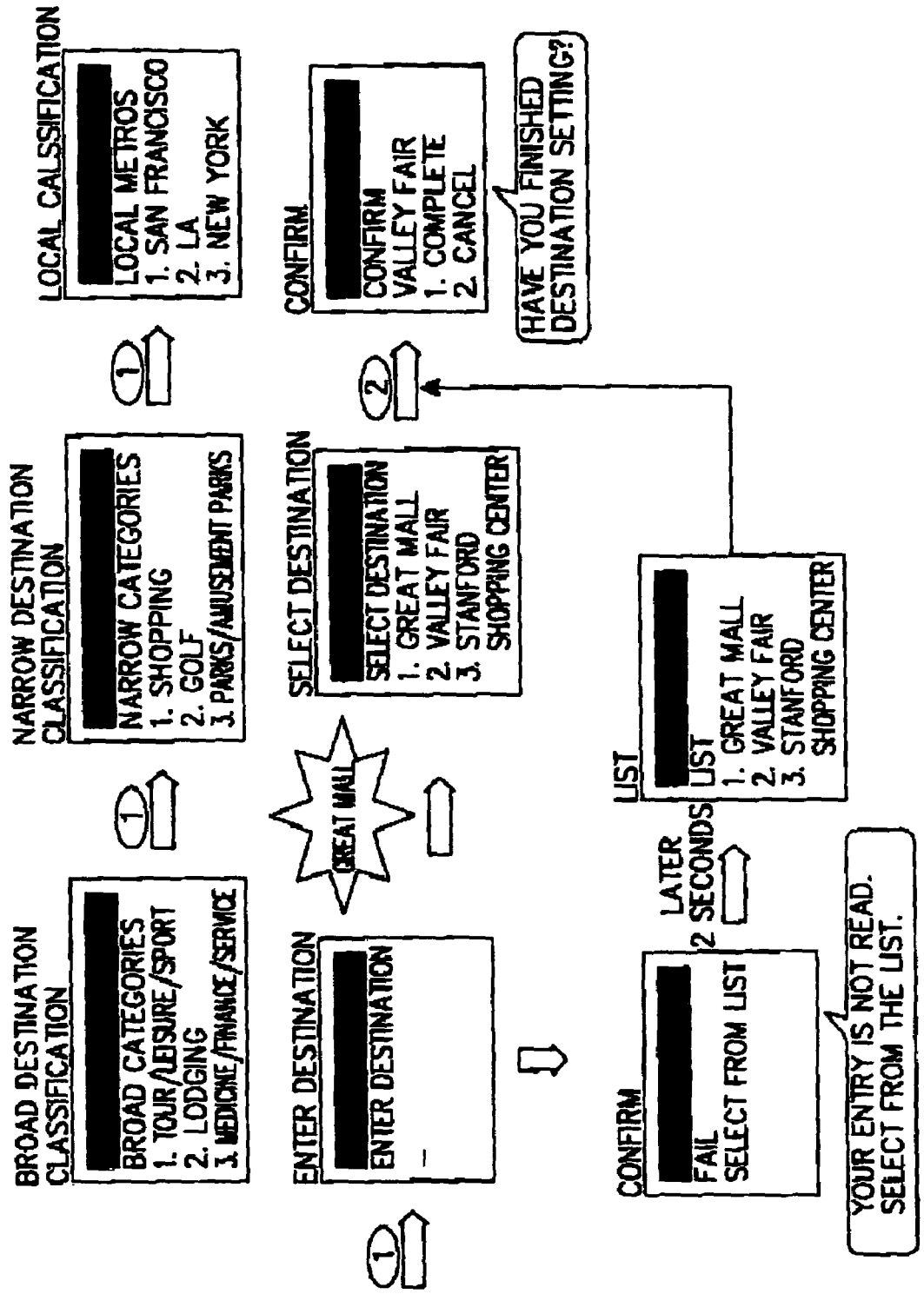
FIG. 25 illustrates displays provided to set a destination in the navigation terminal according to the present invention.

FIG. 25 illustrates displays provided when a menu item "New Setting" is selected in the destination setting menu in the navigation terminal according to the present invention.

Referring to FIG. 25, the destination can be initially set by selecting appropriate items in pre-classified categories such as broad destination classes, narrower destination sub-classes, and specific destinations. The new destination setting can be performed by directly entering a destination name after a specific local area is selected.

Figure 26:
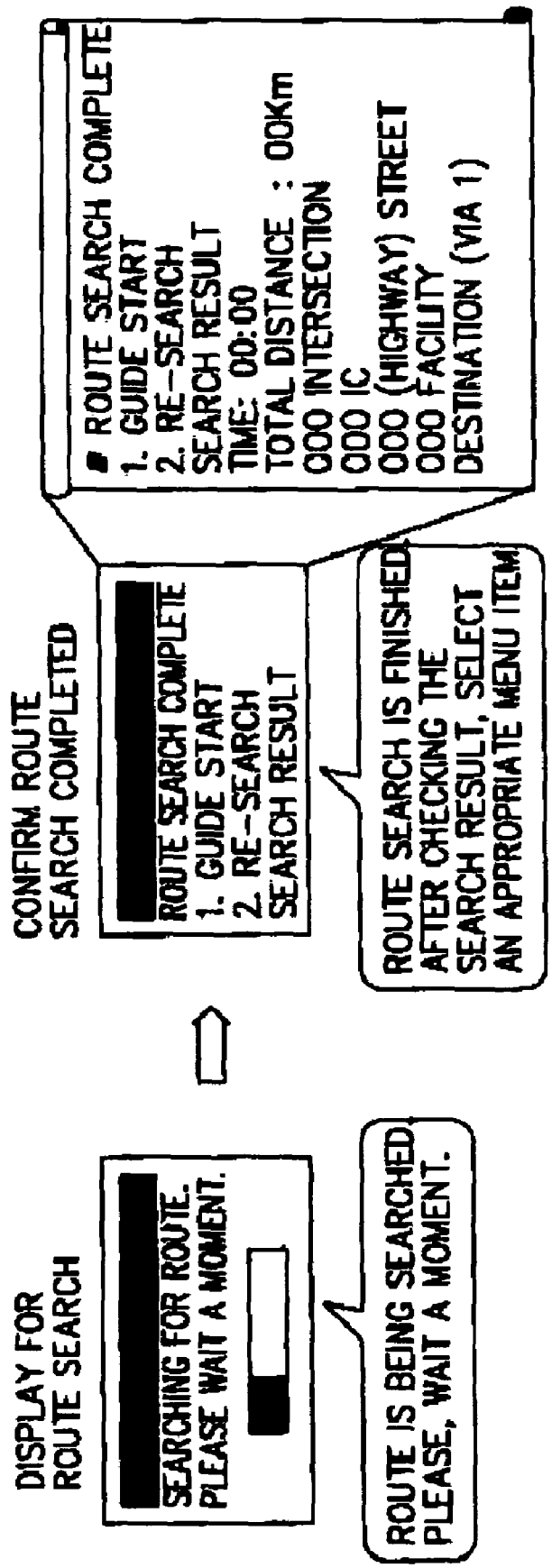
FIG. 26 illustrates displays provided for route search in the navigation terminal according to the present invention.

FIG. 26 illustrates display examples when the route search menu is selected in the navigation terminal according to the present invention.

Referring to FIG. 26, when the "Route Search/Guide" menu item is selected in the menu shown in FIG. 23, an optimum route is searched out between the current vehicle position and the destination. As a result of the route search, time to the destination, total distance, an intersection, an interchange, a street, and a facility can be determined. A high priority is given to time, use of highways (when available), and use of freeways in this order in searching out an optimum route.

Figure 27:
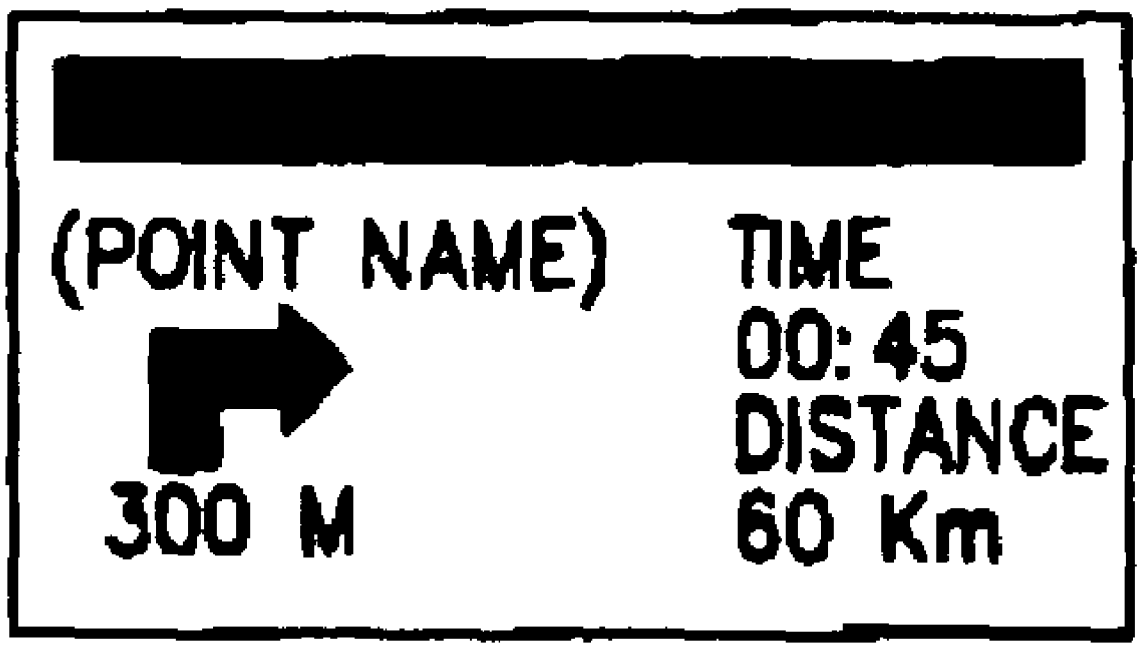
FIG. 27 illustrates a notification display for route guidance in the navigation terminal according to the present invention.

FIG. 27 illustrates a notification display in the navigation terminal during route guidance according to the present invention.

Referring to FIG. 27, for route guidance, there are displayed the name of a guide waypoint like an intersection (point name), image data indicating the direction of the vehicle travel from the guide waypoint, the distance between the current vehicle position and the guide waypoint (300 M), time to the destination (00:45), and distance to go (60 Km).

Figure 28:
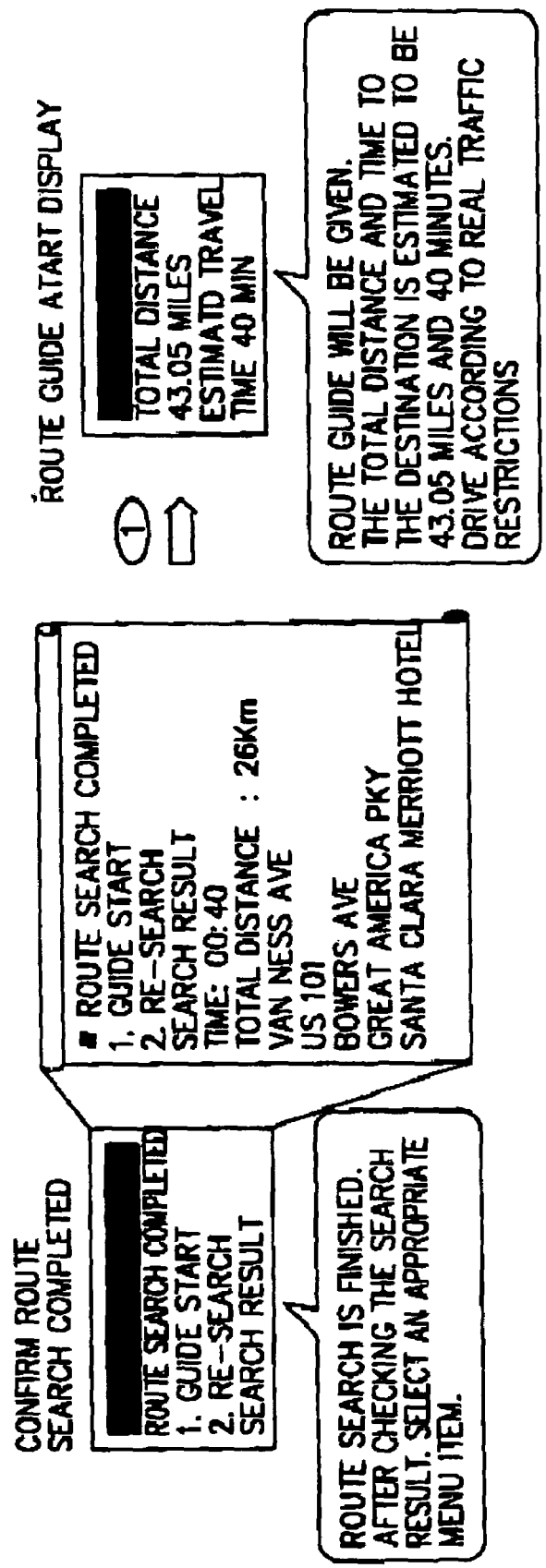
FIG. 28 illustrates displays provided when a guide start menu item is selected after the route search in the navigation terminal according to the present invention.

FIG. 28 illustrates display examples when a guide start item is selected after the route search is completed in the navigation terminal according to the present invention.

Referring to FIG. 28, there are displayed total distance (26 Km) and expected time (40 min).

FIG. 29 illustrates notification display examples in the navigation terminal when a route is guided during driving according to the present invention.

Referring to FIG. 29, while the vehicle is traveling along a searched optimum route, displays of varying intersections, toll gates, interchanges, and in-vicinity facilities at predetermined node points are provided visually and audibly to guide the user along the optimum route between the starting point and the destination.

Figure 30:
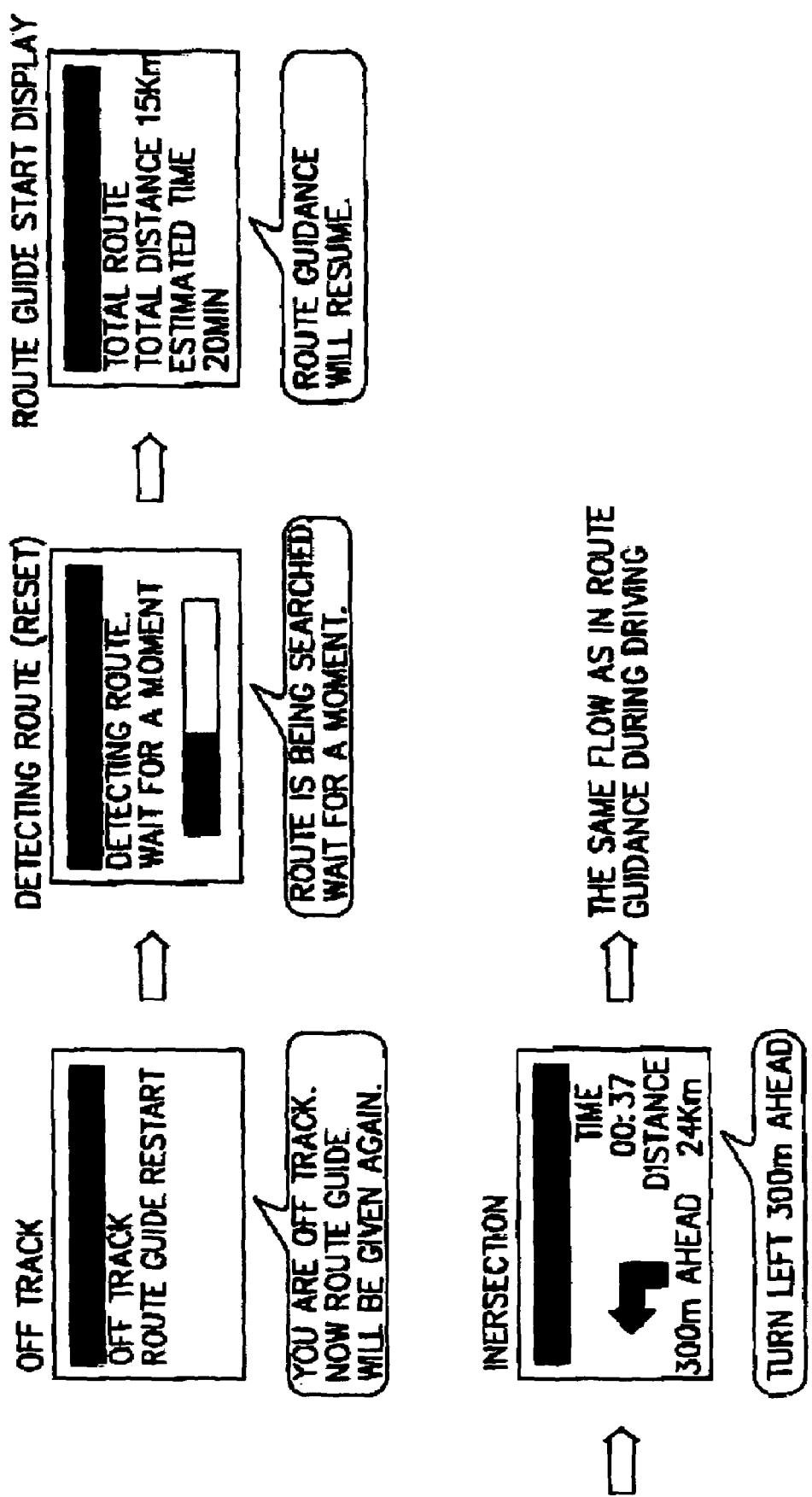
FIG. 30 illustrates displays provided when the vehicle is off the track in the navigation terminal according to the present invention.

FIG. 30 illustrates display examples in the navigation terminal when the vehicle strays off the optimum route according to the present invention.

Referring to FIG. 30, when it is determined that the vehicle is off the track, a notification message is displayed and announced by voice. If a route search mode is reset, the present vehicle position and the destination are transmitted to the information center 100 via the wireless communication network 200. Then the information center 100 searches out an optimum route between the present position and the destination and provides an initial route guidance display. During driving, route guidance is provided.

Figure 31:
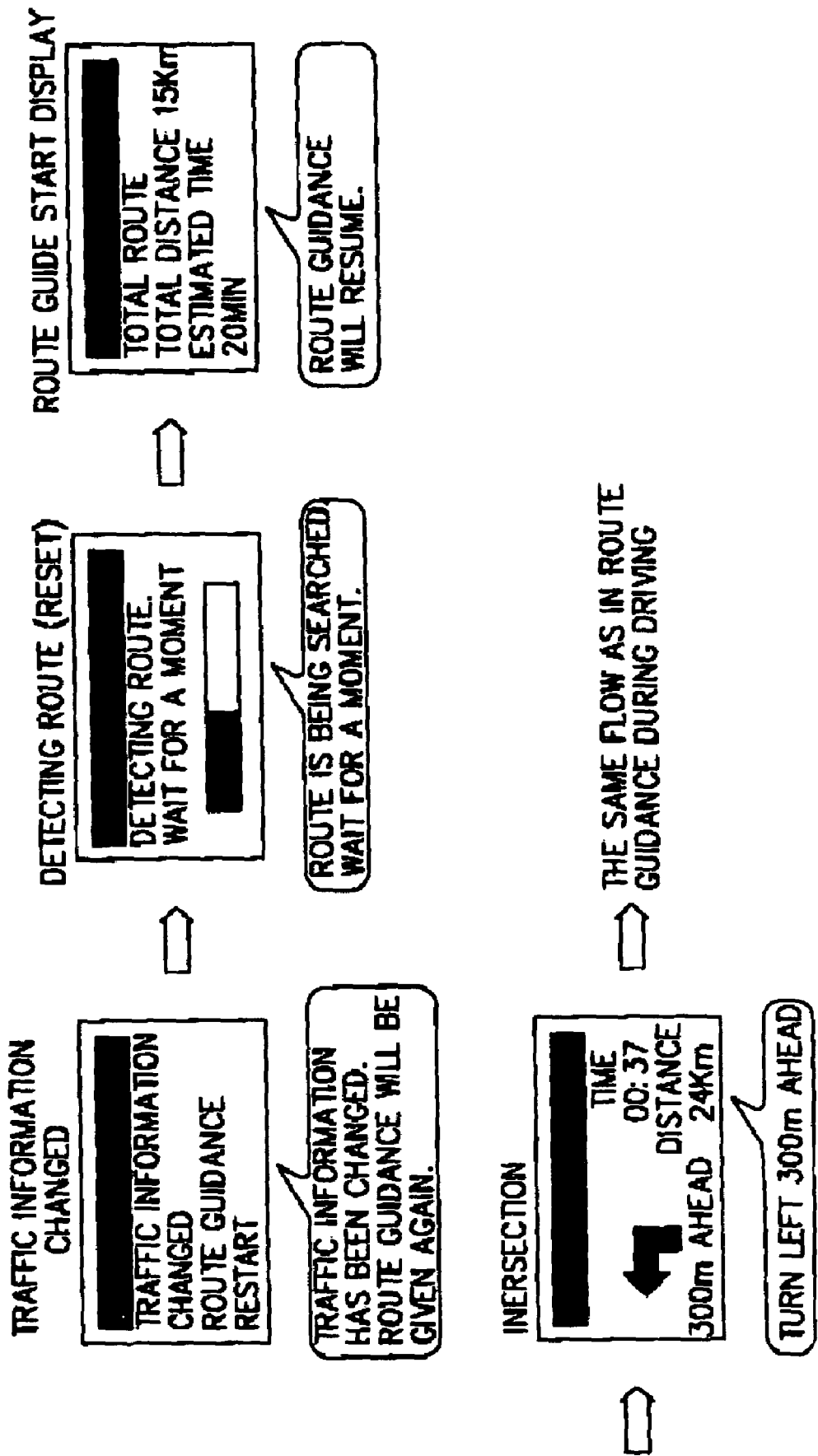
FIG. 31 illustrates displays provided when traffic information is changed in the navigation terminal according to the present invention.

FIG. 31 illustrates display examples in the navigation terminal when traffic information has changed according to the present invention.

Referring to FIG. 31, when it is determined that traffic information has changed, a notification message is announced by voice. If a route search mode is reset, the current vehicle location and the destination are transmitted to the information center via the wireless communication network 200. Then the information center 100 searches out an optimum route between the current position and the destination and provides an initial route guidance display. During driving, route guidance is provided.

As described above, the present invention offers features to implement a navigation function without the need of an additional large capacity hardware component in a portable terminal. Furthermore, the portable terminal can download data via a wireless communication network without building a fixed digital map database so that it can adapt itself flexibly to changes in road and traffic conditions, such as construction and closure of roads and changed traffic regulations with the aid of an updated database in an information center. When the information center calculates a route taking real-time traffic information into account, the user of the portable terminal can also access the real-time traffic information. In addition, the user uses high quality information at a not-high service rate and a service provider provides a premium service, thereby gaining the advantage of his competitors in the market.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A navigation system provides a mobile terminal that processes a conventional call by bi-directional communication with a base station when a first mode is set, requests to an information center route guidance data to guide a vehicle, downloads the route guidance data regarding a vehicle from the information center, determines a notification message regarding at least one node point from a current position of the vehicle and guidance codes in the route guidance data, generates the notification message about the at least one node point referring to a database included therein, and outputs the notification message in a predetermined time period before the vehicle passes through the node point when a second mode is set.

2. The navigation system of claim 1, wherein the downloaded navigation information is transmitted to an ITS (Intelligent Transportation System) terminal mounted to a moving object.

3. The navigation system of claim 1, wherein the predetermined condition includes a destination to which the mobile terminal is to be guided.

4. The navigation system of claim 2, wherein the information center includes a map database that provides navigation information by generating route guidance data according to the current position and destination of the moving object.

5. The navigation system of claim 4, further comprising a display for displaying the state of call processing in the first mode and displaying route guidance information processed from the route guidance data by the ITS terminal in the second mode.

6. The navigation system of claim 5, further comprising an input portion for acting as a user interface for call processing in the first mode and a navigation service in the second mode.

7. The navigation system of claim 6, wherein the input portion is a microphone.

8. The navigation system of claim 6, wherein the input portion is a touch pad.

9. The navigation system of claim 6, further comprising a keypad for acting as a user interface for call processing in the first mode and a navigation service in the second mode, and key assignment memory areas for assigning keys of the keypad for the first and second modes.

10. The navigation system of claim 1, wherein the route guidance data is transmitted to an ITS terminal which is connected to the mobile terminal.

11. The navigation system of claim 2, wherein a travel direction of the vehicle determined by the bearing at intersection in the ITS terminal.

12. The navigation system of claim 10, wherein the ITS terminal determines distance from present position of the vehicle to the intersection using the x and y coordinates in a mesh.

13. The navigation system of claim 1, wherein the second mode is selected when a navigation menu is selected.

14. The navigation system of claim 1, wherein the second mode is selected when a key designated for navigation is pressed.

15. A mobile terminal that transmits data received from an information center by wireless communication to an ITS (Intelligent Transportation System) terminal, and transmits data received from the ITS terminal to the information center, comprising:

an input portion for acting as a user interface for a route guiding service in a navigation mode selected by the user;

a display for displaying route guidance data to guide a vehicle and information about a vehicle received from the ITS terminal; and a control portion for determining a notification message regarding at least one node point from a current position of the vehicle and guidance codes in the route guidance data, generating the notification message about the at least one node point referring to a database included therein, and outputting the notification message in a predetermined time period before the vehicle passes through the node point.

16. The mobile terminal of claim 15, wherein when a call is sensed in the navigation mode, the navigation mode is transitioned to a voice call mode and the call is processed in the voice call mode.

17. The mobile terminal of claim 15, wherein the route guidance data includes bearing at intersection and x and y coordinates in mesh.

18. The mobile terminal of claim 17, wherein a travel direction of the vehicle determined by the bearing at intersection in the ITS terminal.

19. The mobile terminal of claim 17, wherein the ITS terminal determines distance from present position of the vehicle to the intersection using the x and y coordinates in a mesh.

* * * * *